United States Patent
Ushiro et al.

(10) Patent No.: US 11,346,691 B2
(45) Date of Patent: May 31, 2022

(54) SENSOR MOUNTING STRUCTURE AND SENSOR ADAPTOR

(71) Applicant: OMRON Corporation, Kyoto (JP)

(72) Inventors: Yuki Ushiro, Ayabe (JP); Hiroto Katsura, Ayabe (JP); Makoto Iwai, Kizugawa (JP); Hiroyuki Tsuchida, Ayabe (JP); Yusuke Nakayama, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 424 days.

(21) Appl. No.: 15/891,371

(22) Filed: Feb. 8, 2018

(65) Prior Publication Data

US 2018/0348022 A1 Dec. 6, 2018

(30) Foreign Application Priority Data

Jun. 2, 2017 (JP) .............................. JP2017-110358

(51) Int. Cl.

| | |
|---|---|
| *G01D 11/24* | (2006.01) |
| *G01D 11/30* | (2006.01) |
| *F16B 2/06* | (2006.01) |
| *G01B 5/00* | (2006.01) |
| *F16B 9/02* | (2006.01) |
| *G01B 21/16* | (2006.01) |
| *G01B 7/02* | (2006.01) |
| *F16B 9/00* | (2006.01) |

(52) U.S. Cl.
CPC .............. *G01D 11/30* (2013.01); *F16B 2/06* (2013.01); *F16B 9/02* (2013.01); *G01B 5/0002* (2013.01); *F16B 9/054* (2018.08); *F16B 9/056* (2018.08); *G01B 7/023* (2013.01); *G01B 21/16* (2013.01)

(58) Field of Classification Search
None
See application file for complete search history.

(56) References Cited

FOREIGN PATENT DOCUMENTS

| | | |
|---|---|---|
| CN | 1514217 | 7/2004 |
| CN | 202188893 | 4/2012 |
| CN | 103017808 | 4/2013 |

(Continued)

OTHER PUBLICATIONS

"Office Action of China Counterpart Application", dated May 18, 2020, with English translation thereof, p. 1-p. 32.

(Continued)

*Primary Examiner* — Jill E Culler
*Assistant Examiner* — Ruben C Parco, Jr.
(74) *Attorney, Agent, or Firm* — JCIPRNET

(57) ABSTRACT

The sensor adaptor includes a case body of which a front end is closed and a rear end is open, a cap body being engageable with the rear end of the case body, a seal member interposed between the case body and the cap body, and a fixing portion configured to fix the case body to the mounting portion. A part of the sensor is inserted into an accommodation space of the case body, and the remaining portion of the sensor is drawn out to the outside via an opening of the cap body. The seal member is disposed on a rear end side of the case body to surround the sensor. The seal member is brought into close contact with the case body and the sensor. Accordingly, a gap between the part of the sensor and the case body is sealed from an external space by the seal member.

19 Claims, 17 Drawing Sheets

(56) References Cited

FOREIGN PATENT DOCUMENTS

| CN | 204459485 | | | 7/2015 | |
|---|---|---|---|---|---|
| CN | 204459485 | U | * | 7/2015 | |
| FR | 3055963 | A1 | * | 3/2018 | ............... B08B 3/02 |
| JP | 06066600 | A | * | 3/1994 | |
| JP | H06066600 | | | 3/1994 | |
| JP | 2000329633 | | | 11/2000 | |
| JP | 2004-144655 | | | 5/2004 | |
| JP | 2004144655 | A | * | 5/2004 | |
| KR | 100875876 | | | 12/2008 | |
| WO | WO-2018047105 | A1 | * | 3/2018 | ........... G01D 11/245 |

OTHER PUBLICATIONS

Office Action of Korean Counterpart Application, with English translation thereof, dated Feb. 25, 2019, pp. 1-14.

* cited by examiner

SENSOR MOUNTING STRUCTURE AND SENSOR ADAPTOR

CROSS-REFERENCE TO RELATED APPLICATION

This application claims the priority of Japan patent application serial no. 2017-110358, filed on Jun. 2, 2017. The entirety of the above-mentioned patent application is hereby incorporated by reference herein and made a part of this specification.

BACKGROUND

Technical Field

The disclosure relates to a sensor mounting structure in which a sensor is mounted on a mounting portion via a sensor adaptor for holding a sensor, and a sensor adaptor (hereinafter, also simply referred to as an adaptor) used for the sensor mounting structure.

Description of Related Art

Generally, various sensors mounted in production facilities and so on are often mounted on predetermined portions of the production facilities as mounting portions via sensor adaptors which hold the sensors. For example, in a proximity sensor which detects the presence or absence or a position of a workpiece formed of a metal body as a detection object using a magnetic field, a sensor adaptor for holding the proximity sensor is provided adjacent to a workpiece conveying path or the like of a production line on which the workpiece is conveyed, and the proximity sensor is held by the sensor adaptor, and thus the presence or absence or the position of the workpiece can be detected.

As a sensor adaptor, for example, one disclosed in Japanese Laid-open No. 2004-144655 (Patent Document 1) is known.

The sensor adaptor disclosed in Patent Document 1 is used for mounting a proximity sensor, and includes: an adaptor main body having an insertion hole through which the proximity sensor is inserted and a fixing portion for fixing the proximity sensor inserted into the insertion hole; and a bracket which holds the adaptor main body and is fixed to a mounting portion.

Here, the adaptor main body is formed of a substantially cylindrical member of which both axial ends are open, and a protruding portion for positioning the proximity sensor is provided at a front end of the adaptor main body. Therefore, at the time of maintenance such as a case in which the proximity sensor is temporarily separated therefrom and then mounted again, a case in which the proximity sensor is replaced with a new one, or the like, the positioning when the proximity sensor is newly mounted can be easily performed by separating only the proximity sensor from the sensor adaptor without removing the sensor adaptor from the mounting portion.

However, in the case in which the proximity sensor is mounted using the sensor adaptor disclosed in Patent Document 1, the following problems occurs when the surrounding environment in which the proximity sensor is mounted is an environment which is relatively severe.

For example, in a production line in which cutting work is applied to a workpiece, oil such as cutting oil or foreign matter such as cutting chips may enter between the proximity sensor and the aforementioned adaptor main body, and due to intrusion of the oil or the foreign matter, problems may occur at the time of the maintenance. Specifically, due to the intrusion of oil or foreign matter, the proximity sensor may not easily come off from the adaptor main body, and the insertion of the proximity sensor into the adaptor main body may be hindered by oil or foreign matter attached to the adaptor main body, or even if the proximity sensor can be inserted, the positioning for the proximity sensor may not be performed correctly due to the oil or the foreign matter.

Further, such a problem is not a problem which occurs only in a proximity sensor and is a problem which similarly occurs in various other sensors, and a solution thereto is required.

SUMMARY

Therefore, the disclosure provides a sensor mounting structure and a sensor adaptor which are capable of curbing occurrence of problems at the time of maintenance.

A sensor mounting structure according to the disclosure is formed so that a sensor is mounted on a mounting portion via a sensor adaptor for holding the sensor. The sensor includes a detection part, a casing configured to accommodate the detection part therein, and an external connection part drawn out from a rear end of the casing toward an outside. The sensor adaptor includes a cylindrical case body having an accommodation space provided therein and of which a front end is closed and a rear end is open, a cap body configured to be engageable with the rear end of the case body and having an opening, a seal member interposed between the case body and the cap body, and a fixing portion configured to fix the case body to the mounting portion by holding the case body. A portion of the sensor near a front end is inserted into the accommodation space, and a portion of the sensor located closer to a rear end side than the portion near the front end is drawn to an outside of the accommodation space via the opening. The seal member is disposed at a position on a rear end side of the case body to surround the sensor. In the sensor mounting structure according to the disclosure, the seal member is compressed and deformed at least in a forward and rearward direction of the case body by engaging the cap body with the case body, and thus the seal member is in close contact with the case body and the sensor, the portion of the sensor near the front end is disposed in the accommodation space, and a gap formed between the portion of the sensor near the front end and the case body is sealed from a space outside the accommodation space by the seal member.

A sensor adaptor according to the disclosure which allows mounting of a sensor on a mounting portion by holding the sensor includes a case body, a cap body, a fixing portion and a seal member. The case body is a cylindrical member in which an accommodation space configured to allow insertion of a portion of the sensor near a front end is provided therein and of which a front end is closed and a rear end is open. The cap body is engageable with the rear end of the case body and has an opening configured to draw out a portion of the sensor located closer to a rear end side than the portion near the front end to an outside of the accommodation space. The fixing portion is to fix the case body to the mounting portion by holding the case body. The seal member is capable of being interposed between the case body and the cap body to surround the sensor at a position on a rear end side of the case body and is compressed and deformed at least in a forward and rearward direction of the case body by engaging the cap body with the case body, wherein the seal member is in close contact with the case body and the sensor, the portion of the sensor near the front end is disposed in the accommodation space, and thus a gap formed between the portion of the sensor near the front end and the case body is sealed from a space outside the accommodation space.

DESCRIPTION OF THE EMBODIMENTS

Figure 1:
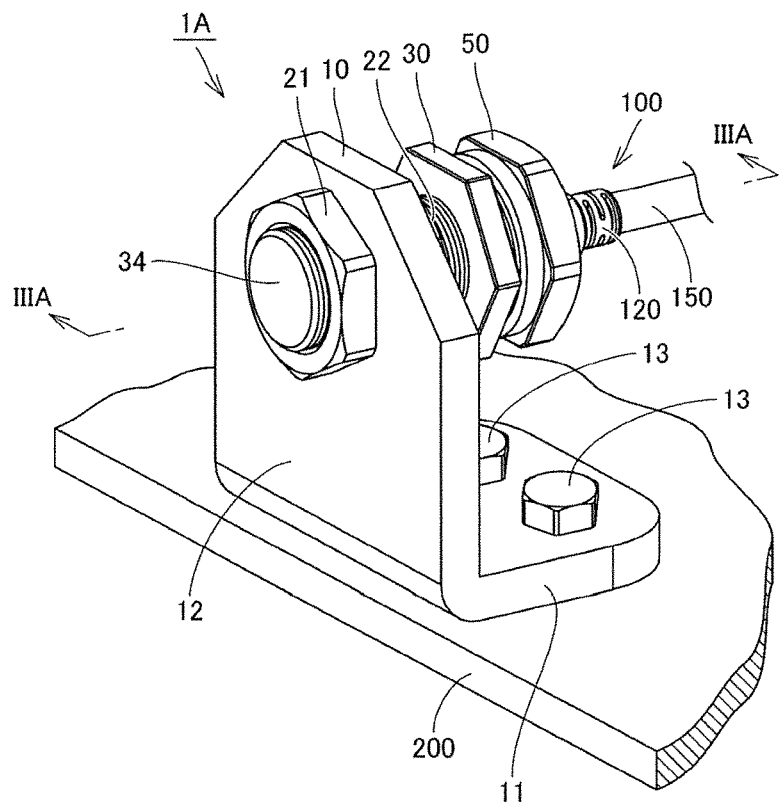
FIG. 1 is a perspective view illustrating a mounting structure of a proximity sensor according to a first embodiment.

Hereinafter, embodiments of the disclosure will be described in detail with reference to the drawings. The following embodiments exemplify a case in which the disclosure is applied to a mounting structure of a proximity sensor and an adaptor for a proximity sensor used therefor. Further, in the following embodiments, the same or common parts are designated by the same reference numerals in the drawings, and descriptions thereof will not be repeated.

First Embodiment

Figure 2:
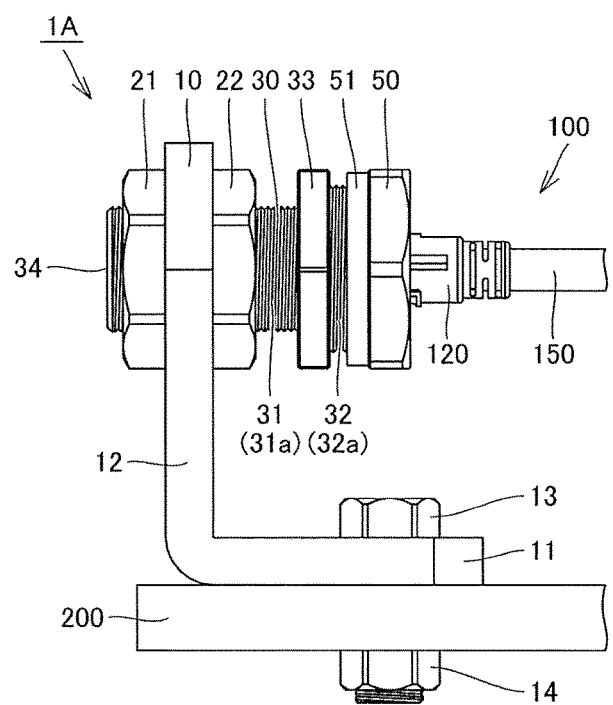
FIG. 2 is a side view illustrating the mounting structure of the proximity sensor according to the first embodiment.
Figure 3A:
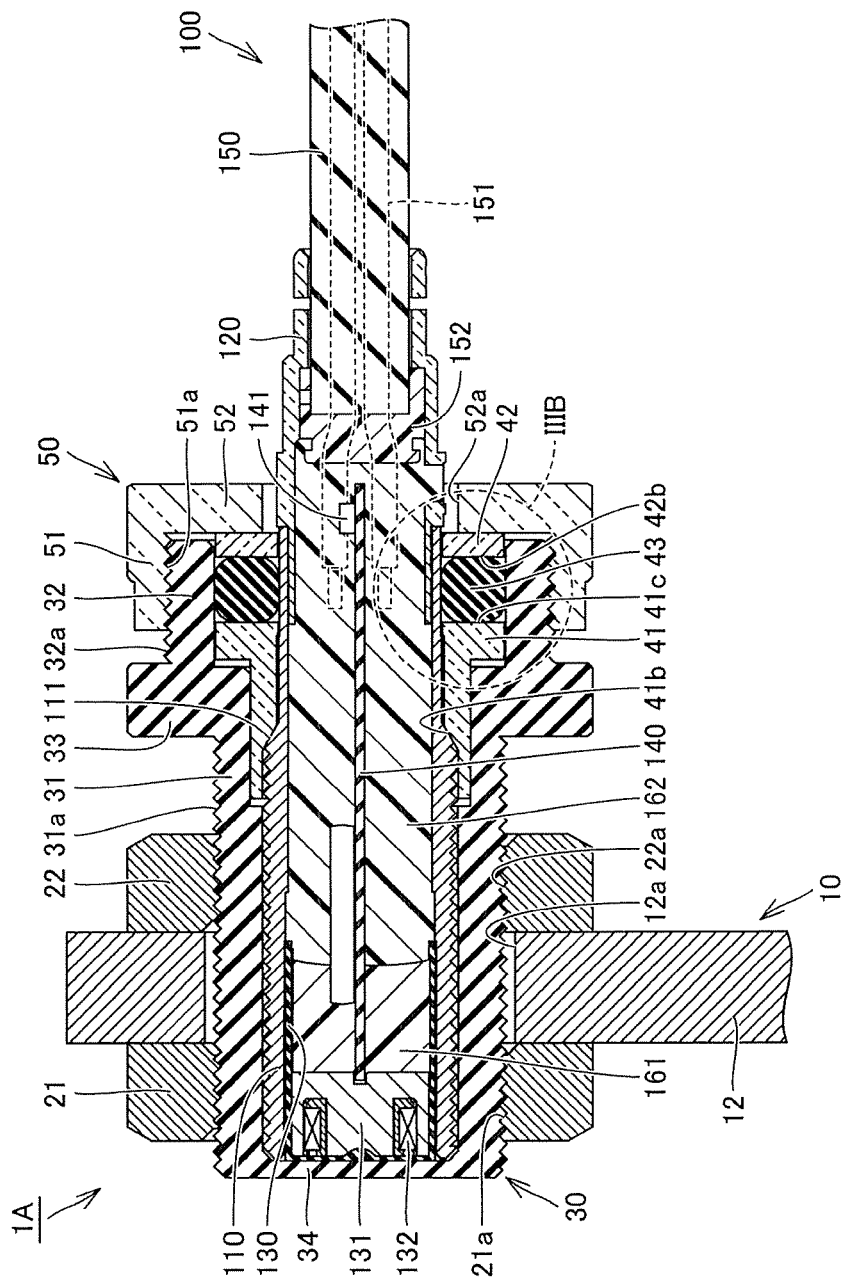
FIGS. 3A and 3B are a cross-sectional view illustrating the mounting structure of the proximity sensor according to the first embodiment and an enlarged cross-sectional view of a main part thereof.
Figure 3B:
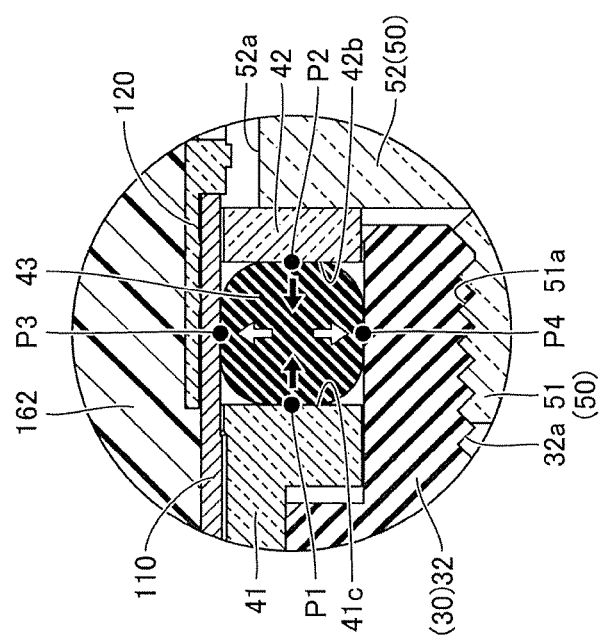
Figure 4:
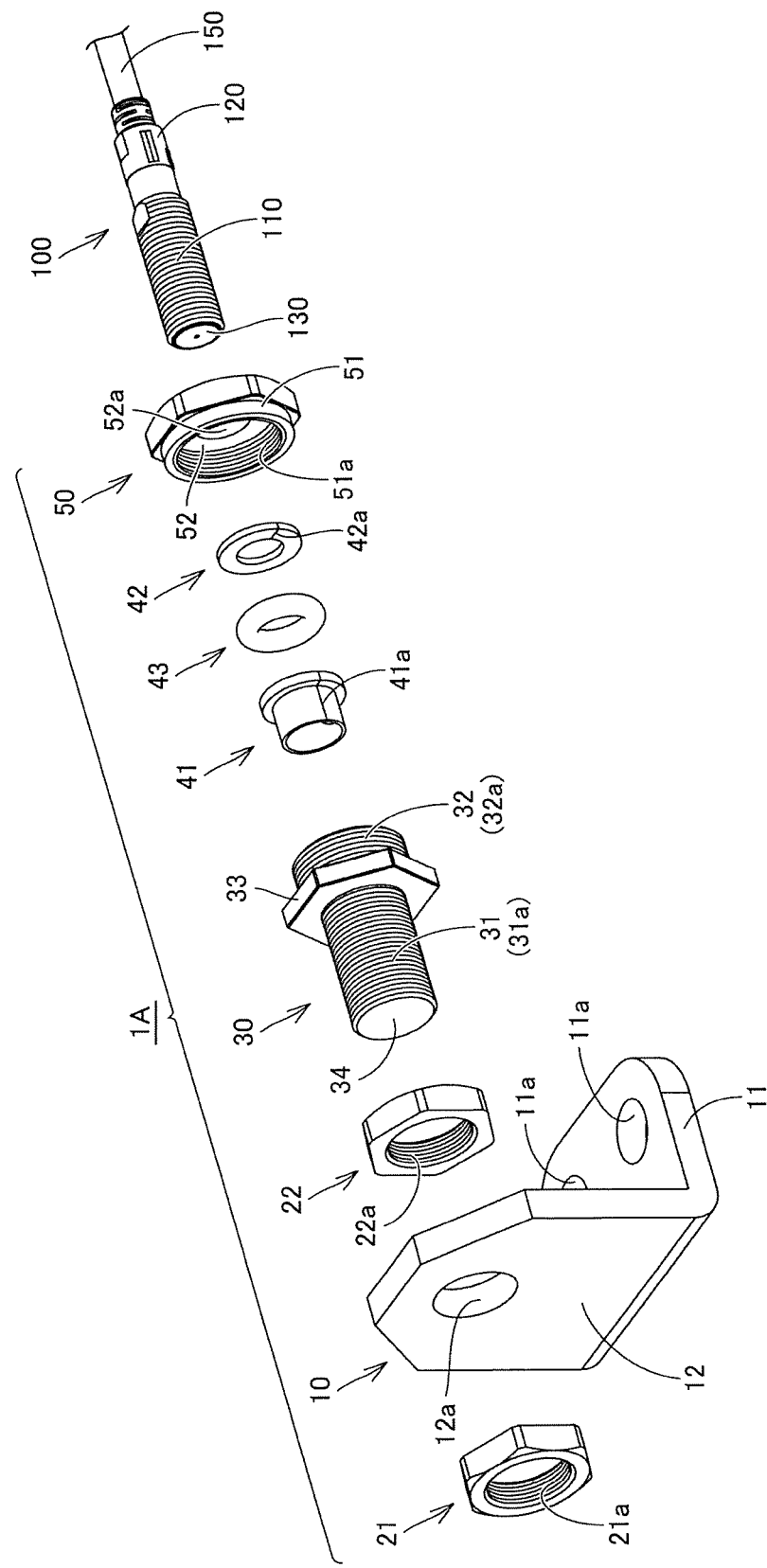
FIG. 4 is an exploded view of the mounting structure of the proximity sensor according to the first embodiment.

FIG. 1 is a perspective view illustrating a mounting structure of a proximity sensor according to a first embodiment, and FIG. 2 is a side view thereof. FIG. 3A is a cross-sectional view taken along line IIIA-IIIA shown in FIG. 1, and FIG. 3B is an enlarged cross-sectional view of a main part illustrated as a region IIIB in FIG. 3A. Further, FIG. 4 is an exploded view of the mounting structure of the proximity sensor illustrated in FIGS. 1 to 3B. First, configurations of the mounting structure of the proximity sensor according to the embodiment and the sensor adaptor used therefor will be described with reference to FIGS. 1 to 4.

As illustrated in FIGS. 1 to 4, the mounting structure of the proximity sensor according to the embodiment is formed by mounting a proximity sensor 100 on a mounting portion 200 via a sensor adaptor 1A which holds the proximity sensor 100.

As illustrated in FIGS. 1 to 4, the proximity sensor 100 has a substantially long cylindrical shape and includes a detection coil 132 (refer to FIG. 3A) as a detection part, a casing including a housing 110, a clamp 120, and a coil case 130 to accommodate the detection coil 132, and a cable 150 as an external connection part drawn out from a rear end of the casing toward the outside.

The housing 110 is formed of a substantially elongated cylindrical member made of a metal material and of which both axial ends are open, and has a front end and a rear end in an axial direction. A coil case 130 is assembled to the front end of the housing 110, and the clamp 120 is assembled to the rear end of the housing 110.

The clamp 120 has a substantially cylindrical shape and is formed of an elastically deformable resin member. The clamp 120 is press-fitted and fixed in the housing 110 so that a part thereof is located inside the housing 110 and the remaining part thereof is located outside the housing 110.

The clamp 120 holds the cable 150 by the cable 150 being inserted therein. Therefore, an opening provided at the rear end of the housing 110 is closed by the clamp 120 and the cable 150 held by the clamp 120.

The coil case 130 is formed of an insulating member having a substantially cylindrical shape with a bottom. The coil case 130 is press-fitted and fixed to the housing 110 so that the bottom thereof is disposed at the front end of the housing 110. Therefore, an opening provided at the front end of the housing 110 is closed by the coil case 130.

As illustrated in FIG. 3A, a core 131 and the above-described detection coil 132 are mainly accommodated inside the coil case 130. The core 131 is formed of a substantially short cylindrical member made of a magnetic material, and a front end surface thereof is in contact with the bottom of the coil case 130. For example, the detection coil 132 is formed into a substantially cylindrical shape by winding a lead wire and is accommodated in an annular concave portion provided in the front end surface of the core 131.

A wiring board 140 is disposed on a rear side of the core 131 and in an internal space of the casing to extend in the axial direction of the housing 110. Various electronic components are mounted on the wiring board 140, and thus various processing circuits which will be described later are formed. The above-described detection coil 132 is electrically connected to the wiring board 140.

Here, among the various electronic components mounted on the wiring board 140, an electronic component 141 mounted on a rear end of the wiring board 140 is a light emitting element which emits light when energized. The light emitting element emits light in accordance with an operation state of the proximity sensor 100 and is configured with, for example, a light emitting diode (LED).

The processing circuit formed by the above-described wiring board 140, various kinds of electronic components, the detection coil 132, and so on includes an oscillation circuit using the detection coil 132 as a resonance circuit element, a discrimination circuit which binarizes an oscillation amplitude of the oscillation circuit by comparing with a threshold value, an output circuit which converts an output of the discrimination circuit into a voltage output or a current output of a predetermined specification, a power supply circuit which converts electric power introduced from the outside into a predetermined power supply specification and then outputs the converted electric power, a light emitting element driving circuit which controls driving of the electronic component 141 as the light emitting element, and so on.

The cable 150 is configured with a composite cable including a plurality of core wires 151 each including a conductive wire therein, and a shield material and a sheath which cover the plurality of core wires 151. A part of the cable 150 is inserted into the opening on the rear end side of the housing 110 while being held by the clamp 120, and thus a distal end of the cable 150 (that is, a distal end of the conductive wire included in each of the plurality of core wires 151) is electrically connected to the above-described wiring board 140.

Further, a plug 152 is provided at a front end position of the sheath of the cable 150. The plug 152 is a member for preventing generation of a gap between the cable 150 and the clamp 120, and the cable 150 is held by the clamp 120 via the plug 152. The above-described plurality of core wires 151 are drawn forward from a front end of the plug 152.

The internal space of the casing in which the above-described wiring board 140 and so on are disposed is sealed by a first resin sealing portion 161 and a second resin sealing portion 162. The first resin sealing portion 161 mainly seals the core 131, the detection coil 132 and the front end of the wiring board 140 which are accommodated in the coil case 130. The second resin sealing portion 162 mainly seals a portion of the wiring board 140 excluding the front end and a portion of the cable 150 located on a front side of the plug 152. The first resin sealing portion 161 and the second resin sealing portion 162 serve to protect various components accommodated inside the casing and to airtightly and liquid-tightly seal these components from the outside.

Further, in the embodiment, both of the clamp 120 and the second resin sealing portion 162 are formed of a light-transmitting resin material. Therefore, light emitted from the electronic component 141 as the light emitting element described above is projected to the outside through the second resin sealing portion 162 and the clamp 120.

Here, an inclined pressed surface 111 directed to a rear side is provided at a predetermined position on a circumferential surface of the housing 110. The pressed surface 111 is a portion used for positioning the proximity sensor 100, and the details thereof will be described later.

A male screw is formed on a portion of the circumferential surface of the housing 110 near the front end thereof. The male screw is a portion used when the proximity sensor 100 is mounted without using the sensor adaptor 1A according to the embodiment, and in the mounting structure of the proximity sensor according to the embodiment, the male screw is not used.

The male screw formed on the circumferential surface of the housing 110 is provided at a position closer to the front end side of the housing 110 than the above-described pressed surface 111, and the circumferential surface of the housing 110 on the rear end side with respect to the pressed surface 111 is configured as a cylindrical surface on which the male screw or the like is not provided.

As illustrated in FIGS. 1 to 4, the sensor adaptor 1A is configured by combining a plurality of components and includes a bracket 10, a bolt 13 and a nut 14, a front nut 21, a rear nut 22, a case body 30, a front ring 41, a rear ring 42, an O-ring 43, and a cap body 50.

Among them, the bracket 10, the bolt 13, the nut 14, the front nut 21 and the rear nut 22 correspond to a fixing portion which fixes the case body 30 to the mounting portion 200 by holding the case body 30, and the O-ring 43 corresponds to a seal member interposed between the case body 30 and the cap body 50.

Further, among them, the front ring 41 corresponds to a front side auxiliary member interposed between the case body 30 and the O-ring 43 as the seal member in a forward and rearward direction of the case body 30, and the rear ring 42 corresponds to a rear side auxiliary member interposed between the O-ring 43 as the seal member and the cap body 50 in the forward and rearward direction of the case body 30.

The bracket 10 is formed of, for example, a metal member and includes a bottom plate portion 11 put on the mounting portion 200, and a standing wall portion 12 erected from the bottom plate portion 11. A through-hole 11a (refer to FIG. 4) through which a bolt 13 is inserted is provided in the bottom plate portion 11, and an insertion hole 12a (refer to FIGS. 3A and 4) through which the case body 30 is inserted is provided in the standing wall portion 12.

The bolt 13 and the nut 14 serve to fix the bracket 10 to the mounting portion 200. Specifically, the nut 14 is screwed to the bolt 13 in a state in which the bolt 13 is inserted into a through-hole provided in the mounting portion 200 and the through-hole 11a provided in the bracket 10.

The bracket 10 and the mounting portion 200 are held by the bolt 13 and the nut 14 by fastening the bolt 13 to the nut 14, and thus the bracket 10 is fixed to the mounting portion 200. Further, the method of fixing the bracket 10 to the mounting portion 200 is not limited to this.

The front nut 21 and the rear nut 22 serve to fix the bracket 10 and the case body 30. A female screw 21a (refer to FIGS. 3A and 4) is formed on an inner circumferential surface of the front nut 21, and a female screw 22a (refer to FIGS. 3A and 4) is provided on an inner circumferential surface of the rear nut 22.

The case body 30 has a substantially long cylindrical shape of which a front end is closed and a rear end is open with a bottom. In one or some exemplary embodiments, the case body 30 is formed of a hard resin member, and as the material of the case body 30, for example, polyether ether ketone (PEEK) resin or the like can be used appropriately.

The case body 30 includes a front cylindrical portion 31 located on a front end side thereof, a rear cylindrical portion 32 located on a rear end side thereof, a flange portion 33 located between the front cylindrical portion 31 and the rear cylindrical portion 32, and a closed portion 34 which closes a front end of the front cylindrical portion 31. The case body 30 has a hollow accommodation space formed therein over the front cylindrical portion 31, the rear cylindrical portion 32, and the flange portion 33.

A male screw 31a is provided on an outer circumferential surface of the front cylindrical portion 31, and a male screw 32a is provided on an outer circumferential surface of the rear cylindrical portion 32. Meanwhile, although an inner circumferential surface of the front cylindrical portion 31, an inner circumferential surface of the rear cylindrical portion 32 and an inner circumferential surface of the flange portion 33 has a stepped portion in a part, they are substantially constituted as a cylindrical surface on which a female screw or the like is not provided.

The front cylindrical portion 31 is inserted through the insertion hole 12a provided in the standing wall portion 12 of the bracket 10, and the case body 30 is fixed to the bracket 10 by the front nut 21 and the rear nut 22 fastened to the front cylindrical portion 31.

More specifically, the female screws 21a and 22a provided on the inner circumferential surfaces of the front nut 21 and the rear nut 22 are screwed onto the male screw 31a provided on the outer circumferential surface of the front cylindrical portion 31, and the standing wall portion 12 of the bracket 10 is sandwiched between the front nut 21 and the rear nut 22 by fastening the front nut 21 and the rear nut 22, and thus the case body 30 is fixed to the bracket 10.

As illustrated in FIG. 3A, a portion of the proximity sensor 100 near the front end thereof is accommodated in the accommodation space provided inside the case body 30. Specifically, the proximity sensor 100 is inserted into an inside of the case body 30 from a rear end side of the case body 30 so that almost all parts of the casing of the proximity sensor 100 are disposed in the accommodation space of the case body 30, and thus a front end of the proximity sensor 100 including the detection coil 132 is disposed close to the closed portion 34 of the case body 30.

The front ring 41, the rear ring 42 and the O-ring 43 are fitted to the housing 110 of the proximity sensor 100 which is accommodated inside the case body 30. Therefore, the front ring 41, the rear ring 42 and the O-ring 43 are interposed between the proximity sensor 100 and the case body 30 in a radial direction of the case body 30.

Specifically, the front ring 41, the rear ring 42 and the O-ring 43 are externally fitted to the housing 110 in the order of the front ring 41, the O-ring 43, and the rear ring 42 from the front side of the case body 30. Therefore, the front ring 41 is interposed between the case body 30 and the O-ring 43 in the forward and rearward direction of the case body 30, the O-ring 43 is interposed between the front ring 41 and the rear ring 42 in the forward and rearward direction of the case body 30, and the rear ring 42 is interposed between the O-ring 43 and the cap body 50 in the forward and rearward direction of the case body 30.

Among them, both the rear ring 42 and the O-ring 43 are located to surround the housing 110 on a rear side of the above-described position at which the pressed surface 111 of the housing 110 is provided, and almost all parts of the front ring 41 are also located to surround the housing 110 on the rear side of the position at which the pressed surface 111 of the housing 110 is provided. As described above, all of the front ring 41, the rear ring 42 and the O-ring 43 are disposed at positions on the rear end side of the case body 30.

The front ring 41 is formed of a substantially cylindrical resin member and has a shape capable of expanding and contracting by having a slit-shaped discontinuous portion 41a (refer to FIG. 4) in a part in a circumferential direction thereof. The rear ring 42 is formed of a substantially flat ring-shaped resin member and has a shape capable of expanding and contracting by having a slit-shaped discontinuous portion 42a (refer to FIG. 4) in a part in a circumferential direction thereof.

The front ring 41 and the rear ring 42 are formed of a hard member, and for example, a nylon resin or the like can be suitably used as a material of the front ring 41 and the rear ring 42. Here, when the front ring 41 and the rear ring 42 (particularly the rear ring 42) are formed of light-transmitting members, the light emitted from the electronic component 141 as the light emitting element provided in the proximity sensor 100 can be projected to the outside without interruption.

Further, the front ring 41 has an inclined pressing surface 41b directed to the front end side of the case body 30 on an inner circumferential surface thereof. The pressing surface 41b corresponds to a pressing portion which presses the proximity sensor 100 forward. The pressing surface 41b is used for positioning the proximity sensor 100 together with the pressed surface 111 provided on the housing 110 of the proximity sensor 100, and the details thereof will be described later.

The O-ring 43 is formed of, for example, an elastically deformable rubber annular member. The O-ring 43 serves to airtightly and liquid-tightly seal the accommodation space of the case body 30 from an external space in a mounted state in which the portion of the proximity sensor 100 near the front end thereof is disposed in the accommodation space of the case body 30.

An inner diameter of each of the front ring 41, the rear ring 42 and the O-ring 43 is formed to be smaller than an outer diameter of the housing 110 on the front end side of the portion of the proximity sensor 100 in which the pressed surface 111 is provided and also to be equal to or slightly larger than the outer diameter of the housing 110 on the rear end side of the portion in which the pressed surface 111 is provided.

As illustrated in FIGS. 1 to 4, the cap body 50 has a substantially cylindrical shape and includes a cylindrical portion 51 and a rear wall portion 52 extending from a rear end of the cylindrical portion 51. A female screw 51a is provided on an inner circumferential surface of the cylindrical portion 51, and an opening 52a is provided in the rear wall portion 52.

The cap body 50 is formed of a hard member, and for example, a nylon resin or the like can be suitably used as a material of the cap body 50. Here, when the cap body 50 is formed of a light-transmitting member, the light emitted from the electronic component 141 as the light emitting element provided in the proximity sensor 100 can be projected to the outside without interruption.

The cap body 50 is engaged with the rear end of the case body 30 in a state in which the proximity sensor 100 is inserted through the opening 52a provided in the rear wall portion 52. More specifically, the cylindrical portion 51 of the cap body 50 is located outside the rear cylindrical portion 32 to surround the rear cylindrical portion 32 of the case body 30, and the female screw 51a provided on the inner circumferential surface of the cylindrical portion 51 and the male screw 32a provided on the outer circumferential surface of the rear cylindrical portion 32 are screwed together, and thus the cap body 50 is assembled to the case body 30 to cover the rear end of the case body 30.

Accordingly, a portion of the proximity sensor 100 located closer to the rear end side than the portion near the front end is drawn out from the opening 52a of the cap body 50 to the outside. More specifically, a portion of the clamp 120 of the casing of the proximity sensor 100 near a rear end and a portion of the cable 150 drawn out from the clamp 120 are drawn out to an outside of the sensor adaptor 1A.

Here, an inner surface of the rear wall portion 52 of the cap body 50 is in contact with a rear end surface of the rear ring 42, and thus the front ring 41, the rear ring 42 and the O-ring 43 are pressed toward the front end side of the case body 30. Accordingly, the O-ring 43 is compressed and deformed by being sandwiched between the front ring 41 and the rear ring 42 in the forward and rearward direction of the case body 30 and thus in close contact with both the proximity sensor 100 and the case body 30.

More specifically, as illustrated in FIG. 3B, a front end P1 of the O-ring 43 is disposed to face a contact surface 41c formed by a rear end surface of the front ring 41, and a rear end P2 thereof is disposed to face a contact surface 42b formed by a front end surface of the rear ring 42. Further, an inner end P3 of the O-ring 43 is disposed to face an outer circumferential surface of the housing 110 of the proximity sensor 100, and an outer end P4 thereof is disposed to face an inner circumferential surface of the cap body 50.

As described above, when the cap body 50 is engaged with the rear end of the case body 30 by screwing, the cap body 50 relatively moves to the case body 30 side (that is, the front side) by the screwing. Along with this movement, all of the front ring 41, the O-ring 43 and the rear ring 42 are pressed by the cap body 50 and move forward. At this time, as a positioning function for the proximity sensor 100 which will be described later is exerted, the movement of the front ring 41 is stopped at a predetermined point of time.

Even after the movement of the front ring 41 is stopped, the O-ring 43 is sandwiched between the front ring 41 and the rear ring 42, compressed in the forward and rearward direction and is elastically deformed by further screwing the cap body 50 toward the case body 30.

Specifically, as the O-ring 43 is compressed by the front ring 41 and the rear ring 42, deformation occurs at the front end P1 and the rear end P2 of the O-ring 43 in a direction of a black arrow illustrated in the drawing (that is, a direction in which the O-ring 43 is pressed and squeezed in the forward and rearward direction), and thus the O-ring 43 is further deformed in a direction of an outline arrow illustrated in the drawing (that is, a direction in which the O-ring 43 is pressed and expanded in a radial direction). As a result, the inner end P3 and the outer end P4 of the O-ring 43 are pressed against the outer circumferential surface of the housing 110 and the inner circumferential surface of the case body 30, respectively, and are brought into close contact therewith.

As described above, in the mounting structure of the proximity sensor according to the embodiment, the O-ring 43 is compressed and deformed in the forward and rearward direction of the case body 30 by engaging the cap body 50 with the case body 30, and thus the O-ring 43 is brought into close contact with the case body 30 and the proximity sensor 100. Therefore, the portion of the proximity sensor 100 near the front end is disposed in the accommodation space of the case body 30, and thus a gap generated between the portion of the proximity sensor 100 near the front end and the case body 30 is surely sealed from a space outside the accommodation space by the O-ring 43.

Therefore, even when a surrounding environment in which the proximity sensor 100 is mounted is a relatively severe environment such as a production line in which a cutting work is performed on a workpiece, occurrence of various problems at the time of maintenance can be curbed. That is, since the gap generated between the portion of the proximity sensor 100 near the front end and the case body 30 is sealed from the outside space by the O-ring 43, it is possible to prevent oil such as cutting oil and foreign matter such as cutting chips from entering the gap, and thus when the proximity sensor 100 is temporarily removed and mounted again, or when the proximity sensor 100 is replaced with a new one, an operation thereof is greatly facilitated.

Further, in order to secure the close contact of the O-ring 43 to the housing 110 and the case body 30, a screwing amount of the cap body 50 is properly adjusted with respect to the case body 30, and the adjustment may be performed easily, for example, by restricting the screwing amount by bringing the cap body 50 into contact with the case body 30 or by managing a torque when the cap body 50 is screwed.

Figure 6A:
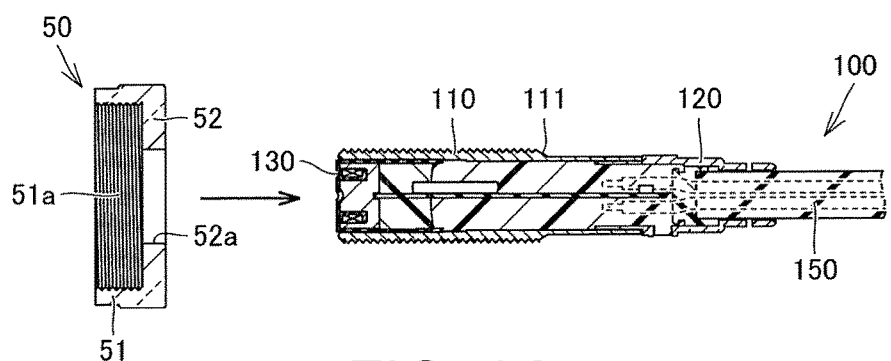
FIGS. 6A to 6E are schematic cross-sectional views illustrating the procedure of mounting the proximity sensor in the mounting structure of the proximity sensor illustrated in FIGS. 1 to 4.
Figure 6B:
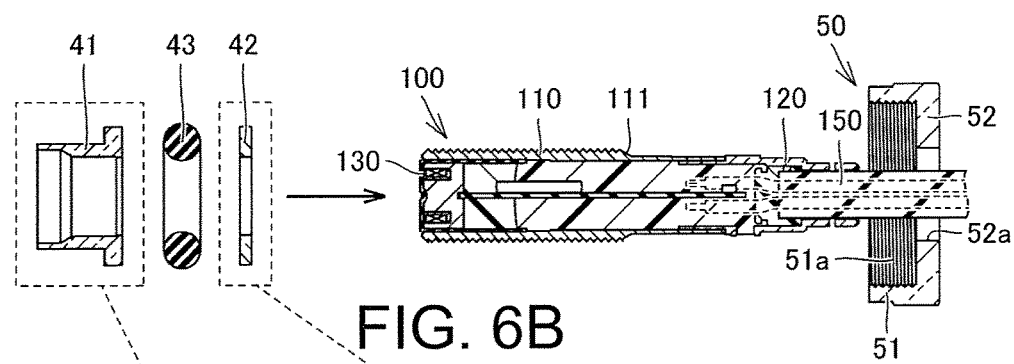
Figures 6C, 6D:
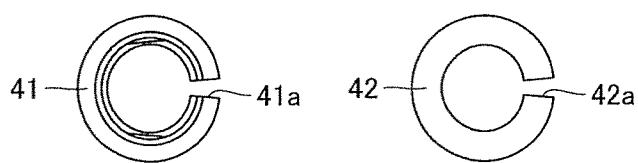
Figure 6E:
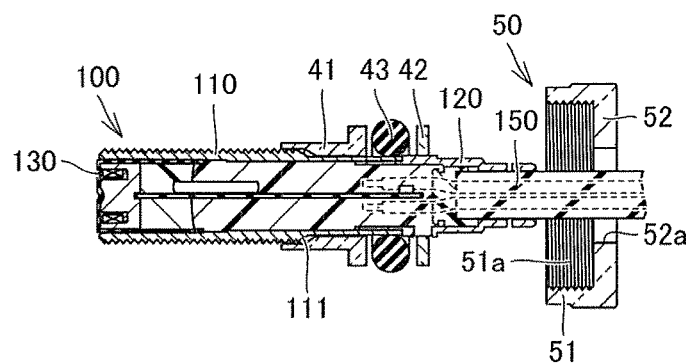
Figure 7A:
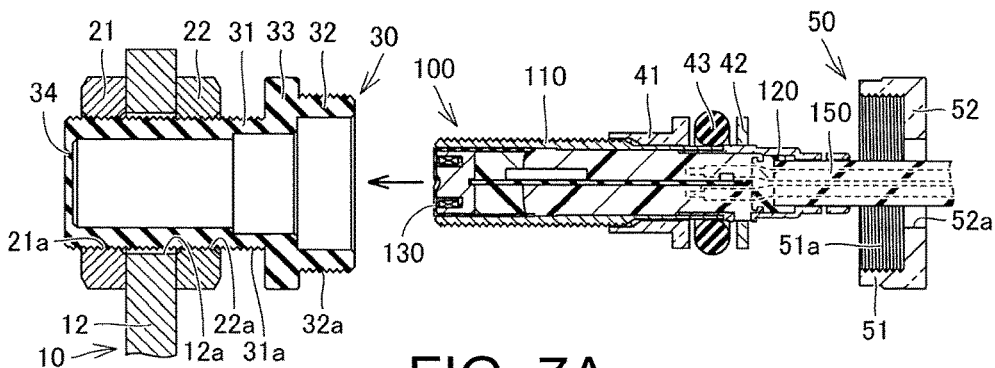
FIGS. 7A to 7D are schematic cross-sectional views illustrating the procedure of mounting the proximity sensor in the mounting structure of the proximity sensor illustrated in FIGS. 1 to 4.
Figure 7B:
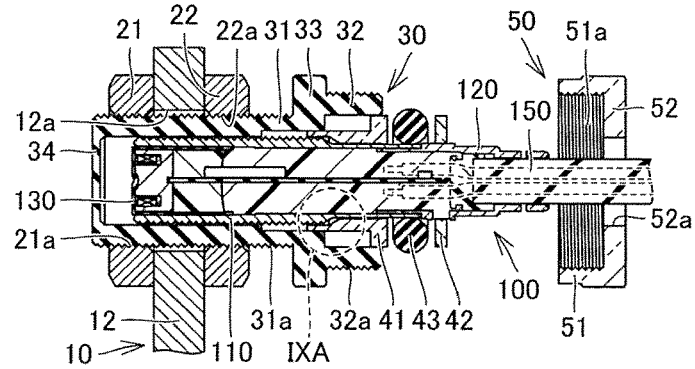
Figure 7C:
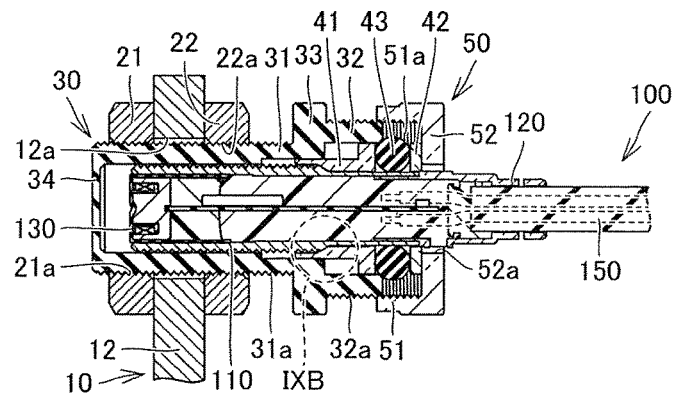
Figure 7D:
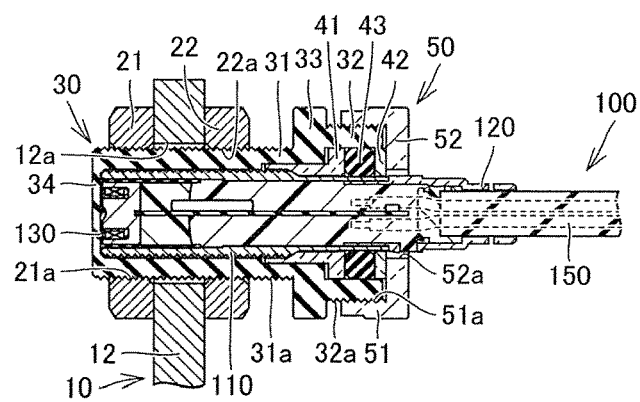
Figure 8:
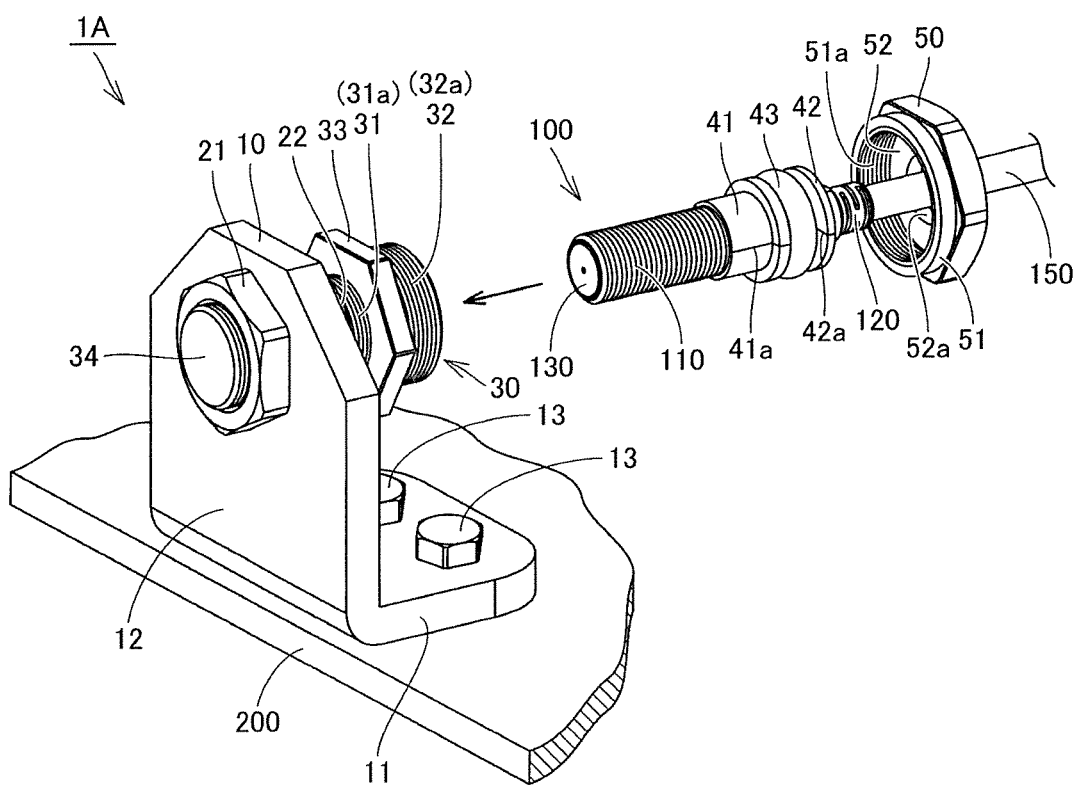
FIG. 8 is a schematic perspective view illustrating the procedure of mounting the proximity sensor in the mounting structure of the proximity sensor illustrated in FIGS. 1 to 4.
Figure 9A:
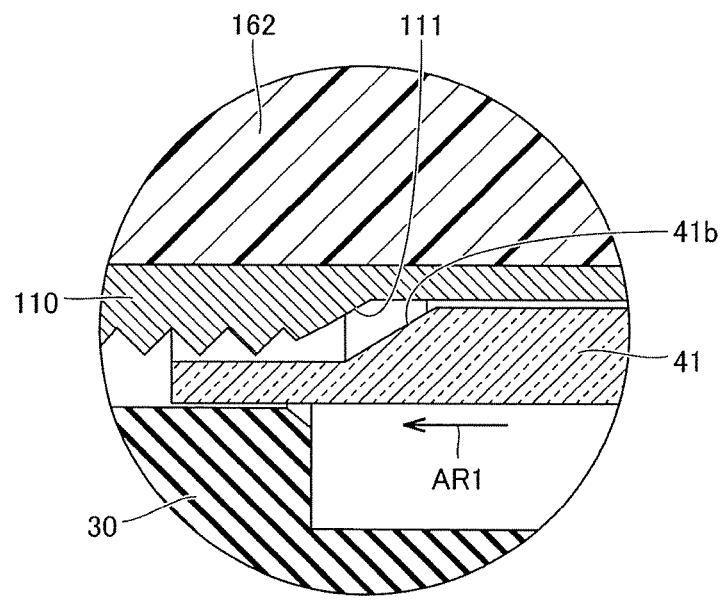
FIGS. 9A and 9B are enlarged cross-sectional views illustrating a main part of FIGS. 7A to 7D.
Figure 9B:
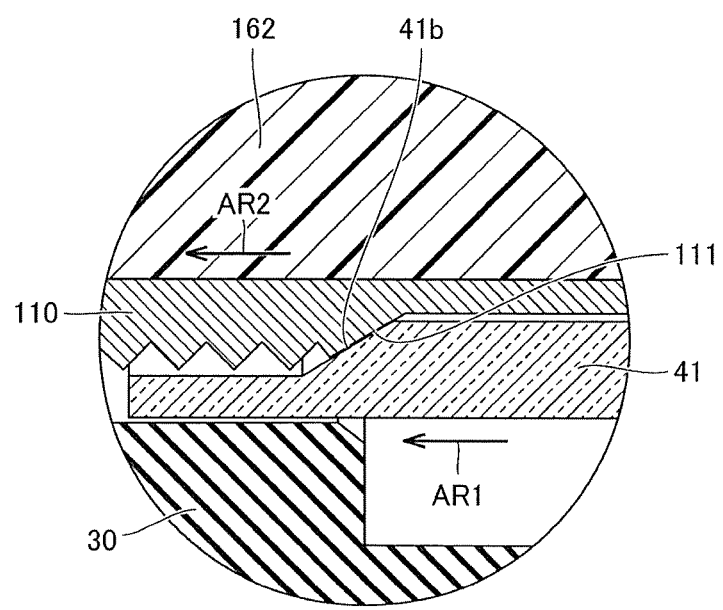

FIGS. 5A to 7D are schematic cross-sectional views illustrating a procedure of mounting the proximity sensor in the mounting structure of the proximity sensor according to the above-described embodiment, and FIG. 8 is a schematic perspective view illustrating the procedure of mounting the proximity sensor. Further, FIG. 9A is an enlarged cross-sectional view of a main part illustrated as a region DCA in FIG. 7B, and FIG. 9B is an enlarged cross-sectional view of a main part illustrated as a region IXB in FIG. 7C. Next, the mounting procedure of the proximity sensor 100 according to the embodiment will be described with reference to FIGS. 5A to 9B. Further, in FIGS. 5A to 7D, the mounting procedure is indicated in chronological order of (A) to (D) or (A) to (C), respectively.

First, referring to FIGS. 5A to 5D, a procedure for fixing the case body 30 to the bracket 10 will be described. Here, it is assumed that the bracket 10 is secured to the mounting portion 200 in advance by the bolt 13 and the nut 14.

Figure 5A:
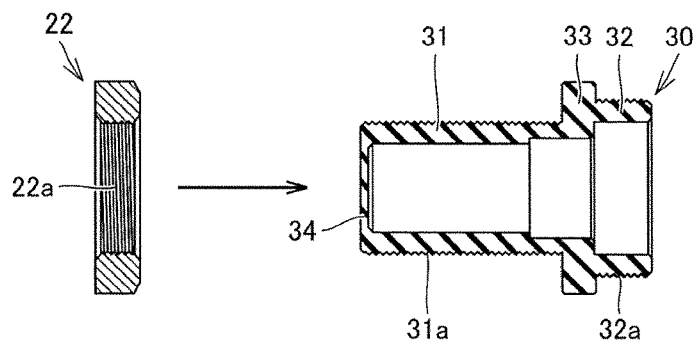
FIGS. 5A to 5D are schematic cross-sectional views illustrating a procedure of mounting the proximity sensor in the mounting structure of the proximity sensor illustrated in FIGS. 1 to 4.

First, as illustrated in FIG. 5A, the rear nut 22 is assembled to the front cylindrical portion 31 of the case body 30. At that time, the rear nut 22 is disposed sufficiently rearward of the closed portion 34 provided at the front end of the case body 30.

Figure 5B:
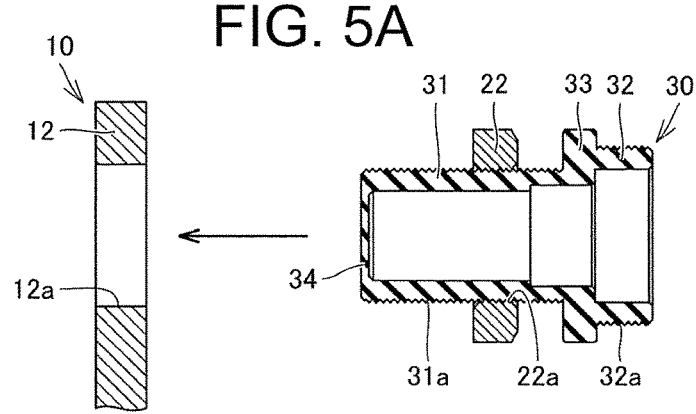

Next, as illustrated in FIG. 5B, the case body 30 to which the rear nut 22 is assembled is inserted into the insertion hole 12a provided in the standing wall portion 12 of the bracket 10. At this time, the front end of the front cylindrical portion 31 of the case body 30 is disposed in front of the bracket 10.

Figure 5C:
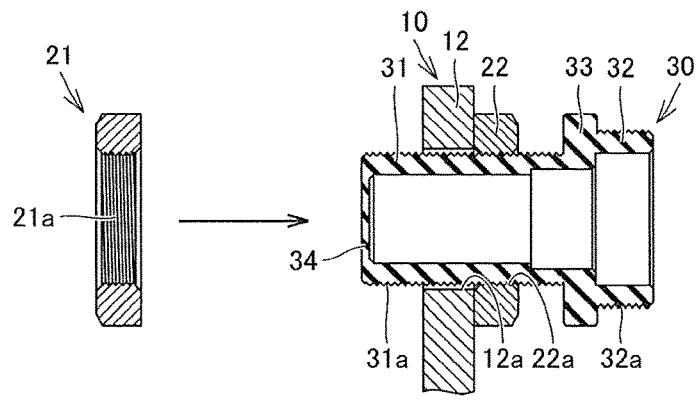

Next, as illustrated in FIG. 5C, the front nut 21 is assembled to the front cylindrical portion 31 of the case body 30. At this time, the front nut 21 and the rear nut 22 are fastened so that the standing wall portion 12 of the bracket 10 is sandwiched between the front nut 21 and the rear nut 22.

Figure 5D:
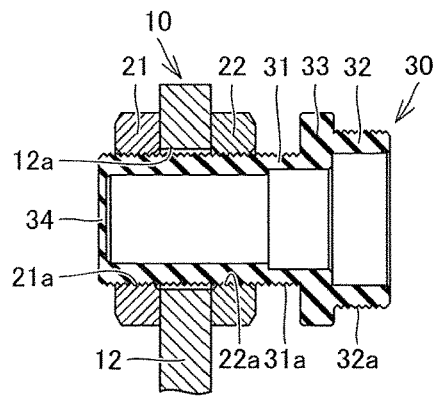

Thus, as illustrated in FIG. 5D, the case body 30 is fixed to the bracket 10.

Next, a procedure for assembling the front ring 41, the rear ring 42, the O-ring 43 and the cap body 50 to the proximity sensor 100 will be described with reference to FIGS. 6A to 6E.

First, as illustrated in FIG. 6A, the cap body 50 is assembled to the proximity sensor 100 from the front side. Specifically, the proximity sensor 100 is assembled to the cap body 50 so that the proximity sensor 100 is inserted into the opening 52a provided in the cap body 50. Further, the assembled cap body 50 is loosely fitted to the proximity sensor 100, and the cap body 50 is inserted to, for example, a position surrounding the cable 150 not to interfere with subsequent works.

Next, as illustrated in FIGS. 6B to 6D, the rear ring 42, the O-ring 43 and the front ring 41 are assembled in this order from the front side to the proximity sensor 100 to which the cap body 50 is assembled. At this time, all of the rear ring 42, the O-ring 43 and the front ring 41 are fitted at positions corresponding to the housing 110 on a rear end side of a portion of the proximity sensor 100 in which the pressed surface 111 is provided.

Here, since the rear ring 42 has the shape capable of expanding and contracting by having the discontinuous portion 42a in a part in the circumferential direction, the rear ring 42 is in an open state (refer to FIG. 6D) so that a shape thereof expands, and since the O-ring 43 is a member which can be elastically deformed, a diameter thereof is in an expanding state, and since the front ring 41 has the shape capable of expanding and contracting by having the discontinuous portion 41a in a part in the circumferential direction, the front ring 41 is in an open state (refer to FIG. 6C) so that a shape thereof expands, and each of them is kept in that state so that the proximity sensor 100 is inserted into the rear ring 42, the O-ring 43 and the front ring 41.

Accordingly, as described above, although the inner diameter of each of the rear ring 42, the O-ring 43 and the front ring 41 is smaller than the outer diameter of the housing 110 on the front end side of the portion in which the pressed surface 111 of the proximity sensor 100 is provided, the rear ring 42, the O-ring 43 and the front ring 41 can be fitted to positions of the proximity sensor 100 corresponding to the housing 110 on the rear end side of the portion in which the pressed surface 111 is provided. Further, the rear ring 42, the O-ring 43 and the front ring 41 return to the original state by their own restoring force after being fitted to the proximity sensor 100 and are fitted to the housing of the proximity sensor 100.

Thus, as shown in FIG. 6E, the front ring 41, the rear ring 42, the O-ring 43 and the cap body 50 are assembled to the proximity sensor 100.

Next, a procedure of assembling the proximity sensor 100 to the case body 30 will be described with reference to FIGS. 7A to 7D and FIG. 8.

First, as illustrated in FIGS. 7A and 8, the proximity sensor 100 (that is, the proximity sensor 100 in the state illustrated in FIG. 6E) in which the front ring 41, the rear ring 42, the O-ring 43 and the cap body 50 are assembled starts to be inserted into the case body 30 fixed to the bracket 10 (that is, the bracket 10 in the state illustrated in FIG. 5D).

At this time, as illustrated in FIG. 7B, when the portion of the proximity sensor 100 near the front end is inserted into the case body 30 to some extent, it is adjusted so that the front ring 41 fitted to the proximity sensor 100 is inserted into the inside of the case body 30 from the rear end thereof.

At this time, as illustrated in FIG. 9A, the front ring 41 moves in a direction of an arrow AR1 (that is, the front side) illustrated in the drawing, but the pressing surface 41b provided on the front ring 41 is not yet in contact with the pressed surface 111 provided on the housing 110 of the proximity sensor 100, and a predetermined gap is formed therebetween.

Next, as illustrated in FIG. 7C, the cap body 50 which is loosely fitted to the proximity sensor 100 starts to be engaged with the rear end of the case body 30. Specifically, the cap body 50 is put on the rear end of the case body 30, and the cap body 50 is screwed and fixed to the rear end of the case body 30.

At this time, as the cap body 50 moves forward, the front ring 41 is pressed forward through the rear ring 42 and the O-ring 43. Therefore, as illustrated in FIG. 9B, the front ring 41 moves in the direction of the arrow AR1 (that is, the front side) illustrated in the drawing, and thus the pressing surface 41b provided on the front ring 41 comes into contact with the pressed surface 111 provided on the housing 110 of the proximity sensor 100.

In this state, as the cap body 50 is further screwed to the rear end of the case body 30, not only the front ring 41 but also the proximity sensor 100 are pressed forward through the rear ring 42 and the O-ring 43, and thus the front ring 41 and the proximity sensor 100 move in a direction of an arrow AR2 (that is, the front side) illustrated in the drawing.

Further, at the same time, the O-ring 43 and the rear ring 42 is also moved by being pressed forward by the cap body 50 and thus is sequentially inserted into the inside of the case body 30 from the rear end thereof.

Further, as the cap body 50 is screwed to the rear end of the case body 30, the front end of the proximity sensor 100 is in contact with an inner surface of the closed portion 34 located at the front end of the case body 30, as illustrated in FIG. 7D. Therefore, the proximity sensor 100 is sandwiched and held between the pressing surface 41b provided on the front ring 41 and the closed portion 34 of the case body 30 in the forward and rearward direction of the case body 30, and in this state, the screwing of the cap body 50 is completed.

As described above, in the mounting structure of the proximity sensor according to the embodiment, when the screwing of the cap body 50 to the case body 30 is completed, the proximity sensor 100 is sandwiched and held between the pressing surface 41b provided on the front ring 41 and the closed portion 34 of the case body 30 in the forward and rearward direction of the case body 30, and thus the positioning function for the proximity sensor 100 is exerted.

Therefore, for example, at the time of maintenance such as a case in which the proximity sensor 100 is temporarily removed and mounted again or a case in which the proximity sensor 100 is replaced with a new one, the positioning in the case in which the proximity sensor is mounted again can be easily performed by releasing the fixing of the cap body 50 to the case body 30 (that is, removing only the proximity sensor 100 and the cap body 50, the front ring 41, the rear ring 42 and the O-ring 43 assembled thereto) without releasing the fixing of the case body 30 to the bracket 10 (that is, without removing the bracket 10, the bolt 13, the nut 14, the front nut 21 and the rear nut 22 of the sensor adaptor 1A).

As described above, in the mounting structure of the proximity sensor according to the embodiment and the sensor adaptor used therefor, it is possible to provide a mounting structure of a proximity sensor and a sensor adaptor used therefor which are capable of curbing occurrence of problems at the time of maintenance and also having excellent convenience at the time of maintenance.

Further, in the mounting structure of the proximity sensor according to the embodiment and the sensor adaptor used therefor, the front end of the proximity sensor 100 is completely covered by the case body 30. Therefore, it is possible to reliably prevent the workpiece from coming into direct contact (collision) with the proximity sensor 100, and it is also possible to prevent an erroneous operation or breakage of the proximity sensor 100.

Second Embodiment

Figure 10A:
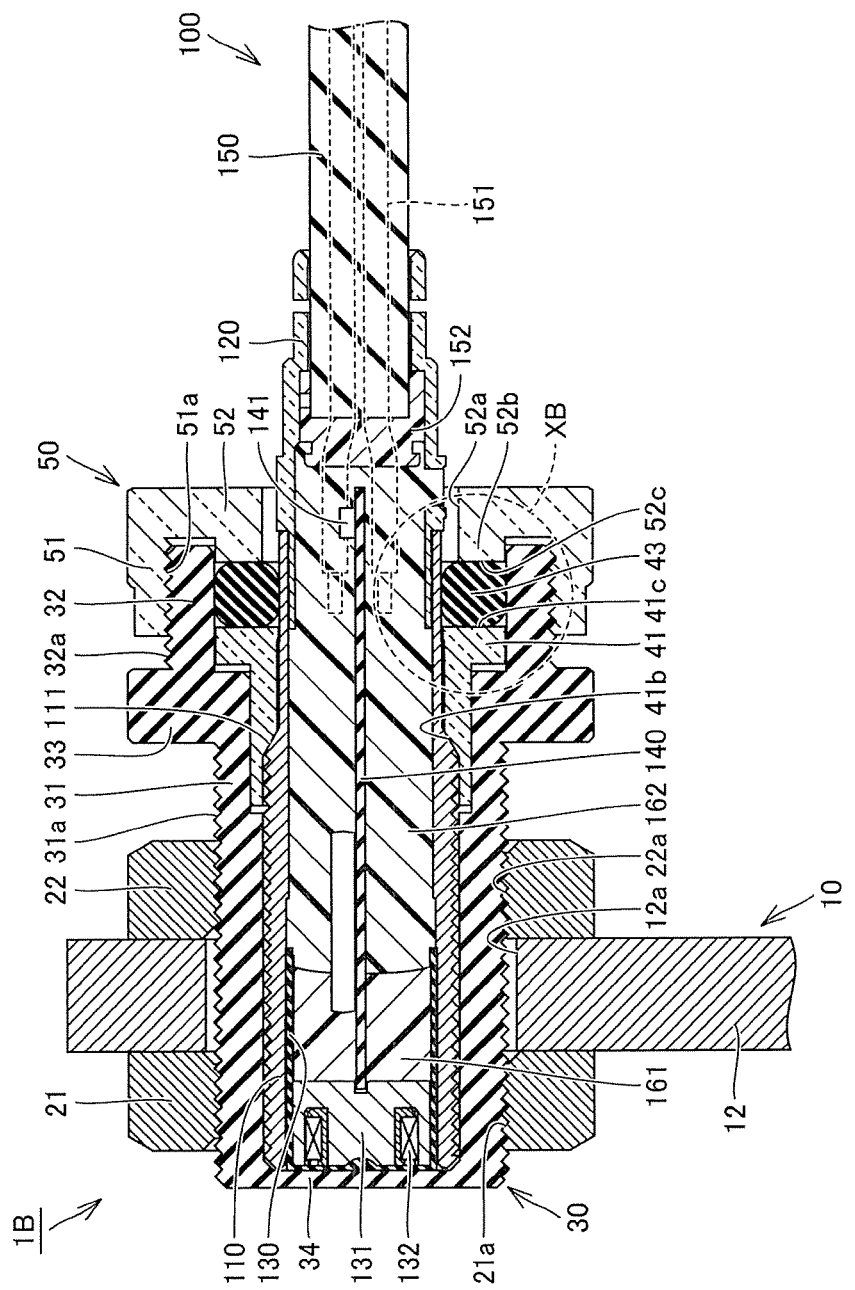
FIGS. 10A and 10B are a cross-sectional view illustrating a mounting structure of a proximity sensor according to a second embodiment and an enlarged cross-sectional view of a main part thereof.
Figure 10B:
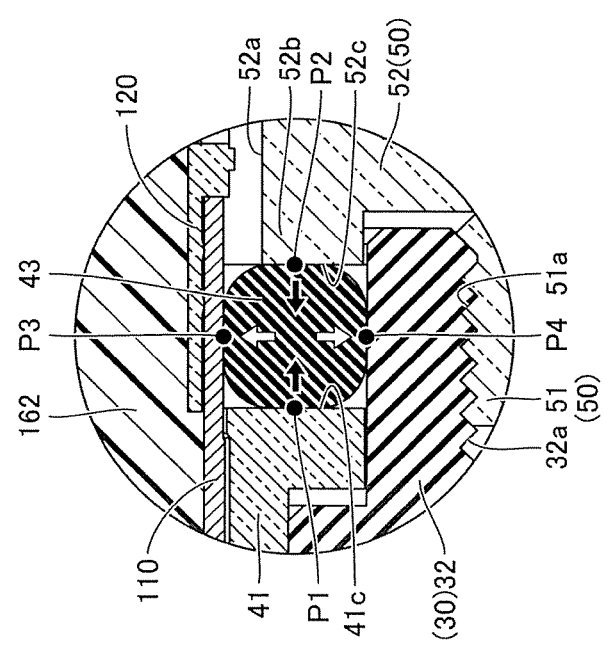

FIG. 10A is a cross-sectional view illustrating a mounting structure of a proximity sensor according to a second embodiment, and FIG. 10B is an enlarged cross-sectional view of a main part illustrated as a region XB in FIG. 10A. Hereinafter, the mounting structure of the proximity sensor according to the embodiment and the sensor adaptor used therefor will be described with reference to FIGS. 10A and 10B.

As illustrated in FIG. 10A, the mounting structure of the proximity sensor according to the embodiment is different from the mounting structure of the proximity sensor according to the above-described first embodiment in a configuration of a sensor adaptor 1B. Specifically, the sensor adaptor 1B does not include the rear ring 42 as the rear side auxiliary member included in the sensor adaptor 1A.

More specifically, the sensor adaptor 1B includes a bracket 10, a bolt 13 and a nut 14 (not illustrated in FIG. 10A), a front nut 21, a rear nut 22, a case body 30, a front ring 41, an O-ring 43 and a cap body 50. Among them, components other than the cap body 50 have the same configurations as those of the above-described sensor adaptor 1A.

The cap body 50 includes a cylindrical portion 51 and a rear wall portion 52, and an annular wall portion 52b is provided in the rear wall portion 52. The annular wall portion 52b is provided to protrude forward from a circumferential edge of an opening 52a provided in the rear wall portion 52. The annular wall portion 52b is a portion for pressing the O-ring 43 forward.

Here, a front end surface of the annular wall portion 52b provided on the cap body 50 is in contact with a rear end of the O-ring 43, and thus the front ring 41 and the O-ring 43 are pressed toward a front end side of the case body 30. Accordingly, the O-ring 43 is compressed and deformed by being sandwiched between the front ring 41 and the annular wall portion 52b of the cap body 50 in the forward and rearward direction of the case body 30 and thus is in close contact with both the proximity sensor 100 and the case body 30.

More specifically, as illustrated in FIG. 10B, a front end Pb of the O-ring 43 is disposed to face a contact surface 41c formed by a rear end surface of the front ring 41, and a rear end P2 thereof is disposed to face a contact surface 52c formed by a front end surface of the annular wall portion 52b of the cap body 50. Further, an inner end P3 of the O-ring 43 is disposed to face an outer circumferential surface of the housing 110 of the proximity sensor 100, and an outer end P4 thereof is disposed to face an inner circumferential surface of the cap body 50.

Therefore, as the O-ring 43 is compressed by the front ring 41 and the cap body 50, deformation occurs at the front end P1 and the rear end P2 of the O-ring 43 in a direction of a black arrow illustrated in the drawing (that is, a direction in which the O-ring 43 is pressed and squeezed in the forward and rearward direction), and thus the O-ring 43 is further deformed in a direction of an outline arrow illustrated in the drawing (that is, a direction in which the O-ring 43 is pressed and expanded in a radial direction). As a result, the inner end P3 and the outer end P4 of the O-ring 43 are pressed against the outer circumferential surface of the housing 110 and the inner circumferential surface of the case body 30, respectively, and are brought into close contact therewith.

Therefore, a portion of the proximity sensor 100 near a front end is disposed in an accommodation space of the case body 30, and thus a gap generated between the portion of the proximity sensor 100 near the front end and the case body 30 is surely sealed from a space outside the accommodation space by the O-ring 43. Accordingly, due to the mounting structure of the proximity sensor according to the embodiment and the sensor adaptor used therefor, it is possible to obtain the same effect as the effect described in the above-described first embodiment and it is possible to greatly curb the occurrence of problems at the time of maintenance.

Third Embodiment

Figure 11A:
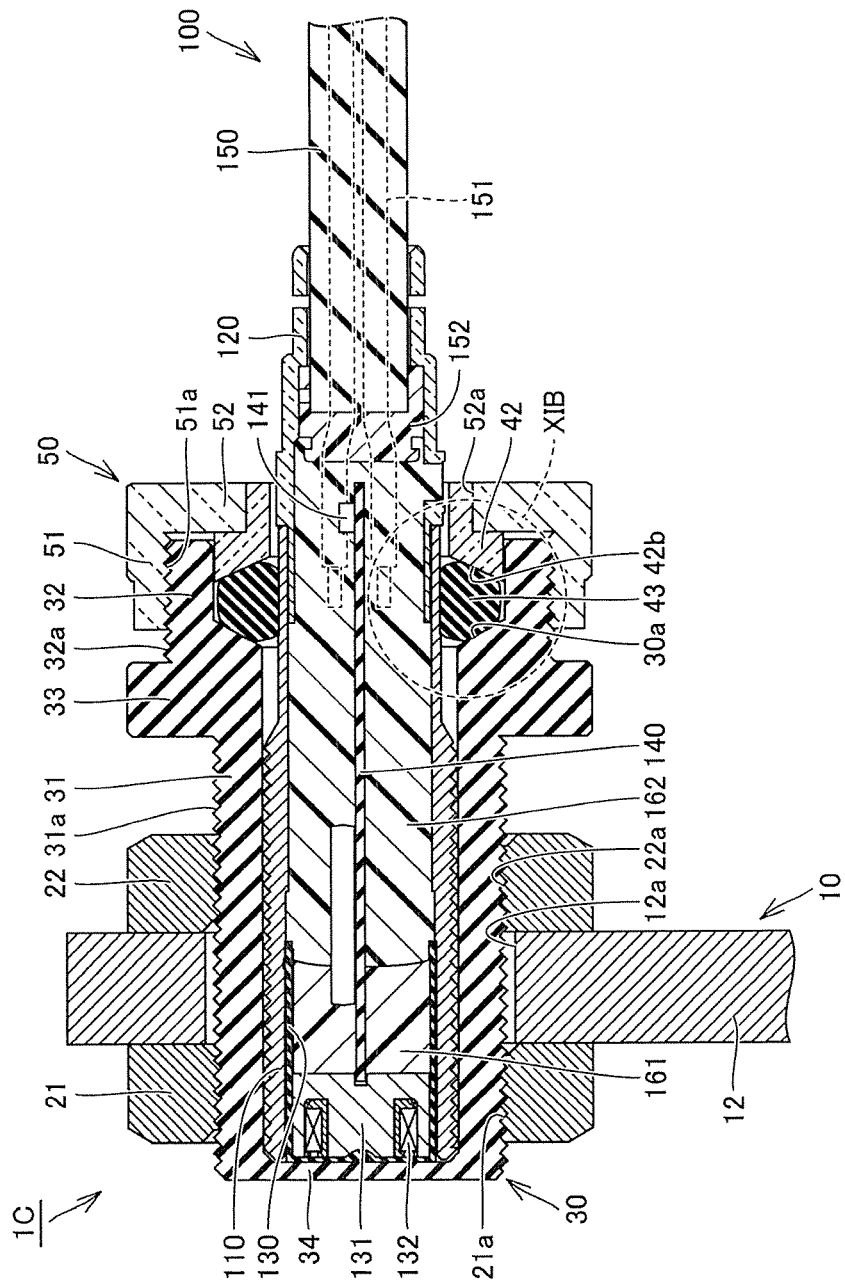
FIGS. 11A and 11B are a cross-sectional view illustrating a mounting structure of a proximity sensor according to a second embodiment and an enlarged cross-sectional view of a main part thereof.
Figure 11B:
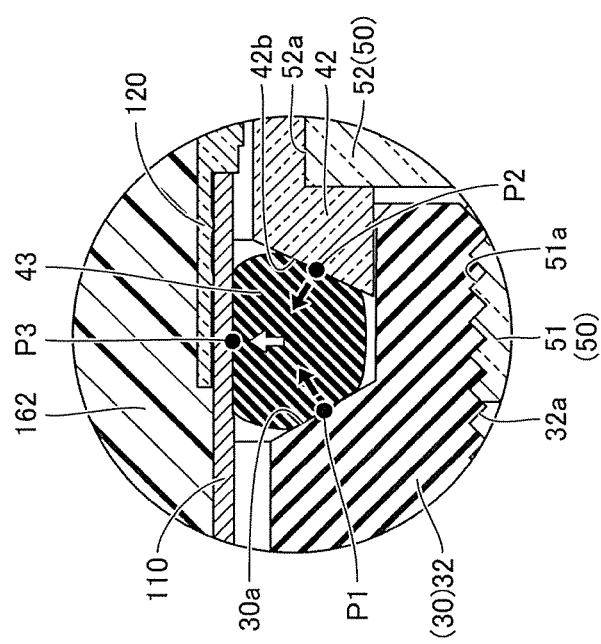

FIG. 11A is a cross-sectional view illustrating a mounting structure of a proximity sensor according to a third embodiment, and FIG. 11B is an enlarged cross-sectional view of a main part illustrated as a region XIB in FIG. 11A. Hereinafter, the mounting structure of the proximity sensor according to the embodiment and the sensor adaptor used therefor will be described with reference to FIGS. 11A and 11B.

As illustrated in FIG. 11A, the mounting structure of the proximity sensor according to the embodiment is different from the mounting structure of the proximity sensor according to the above-described first embodiment in a configuration of a sensor adaptor 1C. Specifically, the sensor adaptor 1C does not include the front ring 41 as the front side auxiliary member included in the sensor adaptor 1A.

More specifically, the sensor adaptor 1C includes a bracket 10, a bolt 13 and a nut 14 (not illustrated in FIG. 11A), a front nut 21, a rear nut 22, a case body 30, a rear ring 42, an O-ring 43 and a cap body 50. Among them, components other than the case body 30 and the rear ring 42 have the same configurations as those of the above-described sensor adaptor 1A.

The case body 30 includes a front cylindrical portion 31, a rear cylindrical portion 32, a flange portion 33 and a closed portion 34 and also has an inclined contact surface 30a at a predetermined position of an inner circumferential surface defining an accommodation space provided therein. The contact surface 30a faces a rear end side of the case body 30 and is located to face the O-ring 43. The contact surface 30a is inclined to approach an inside of the case body 30 as it goes away from the O-ring 43 in the forward and rearward direction of the case body 30.

The rear ring 42 has an inclined contact surface 42b at a front end thereof. The contact surface 42b faces a front end side of the case body 30 and is located to face the O-ring 43. The contact surface 42b is inclined to approach an inside of the case body 30 as it goes away from the O-ring 43 in the forward and rearward direction of the case body 30.

Here, an inner surface of a rear wall portion 52 of the cap body 50 is in contact with the rear end surface of the rear ring 42, and thus the rear ring 42 and the O-ring 43 are pressed toward the front end side of the case body 30. Accordingly, the O-ring 43 is compressed and deformed by being sandwiched between the case body 30 and the rear ring 42 in the forward and rearward direction of the case body 30 and thus in close contact with both the proximity sensor 100 and the case body 30.

More specifically, as illustrated in FIG. 11B, a front end P1 of the O-ring 43 near a radially outer side thereof is disposed to face the contact surface 30a of the case body 30, and a rear end P2 thereof near the radially outer side is disposed to face the contact surface 42b of the rear ring 42. Further, an inner end P3 of the O-ring 43 is disposed to face an outer circumferential surface of the housing 110 of the proximity sensor 100.

Therefore, as the O-ring 43 is compressed by the case body 30 and the rear ring 42, deformation occurs at the front end P1 of the O-ring 43 near the radially outer side and the rear end P2 thereof near the radially outer side in a direction of a black arrow illustrated in the drawing (that is, a direction in which the O-ring 43 is pressed and squeezed in the forward and rearward direction), and thus the O-ring 43 is further deformed in a direction of an outline arrow illustrated in the drawing (that is, a direction in which the O-ring 43 is pressed and expanded mainly inward in the radial direction). As a result, the front end P1 of the O-ring 43 near the radially outer side and the rear end P2 thereof near the radially outer side are in close contact with the contact surface 30a of the case body 30 and the contact surface 42b of the rear ring 42, respectively, and the inner end P3 of the O-ring 43 is pressed against the outer circumferential surface of the housing 110 and is brought into close contact therewith.

Therefore, the portion of the proximity sensor 100 near the front end is disposed in the accommodation space of the case body 30, and thus a gap generated between the portion of the proximity sensor 100 near the front end and the case body 30 is surely sealed from a space outside the accommodation space by the O-ring 43. Accordingly, due to the mounting structure of the proximity sensor according to the embodiment and the sensor adaptor used therefor, it is possible to obtain the same effect as the effect described in the above-described first embodiment and it is possible to greatly curb the occurrence of problems at the time of maintenance.

Further, as described above, in the embodiment, the sensor adaptor 1C does not include the front ring 41 as the front side auxiliary member. Therefore, the positioning with respect to the case body 30 is mainly performed by the O-ring 43 as the seal member.

Specifically, when the cap body 50 is screwed to the case body 30, the O-ring 43 is moved forward by being pressed by the cap body 50 via the rear ring 42, but since the O ring 43 is disposed in advance on the cylindrical outer circumferential surface near the rear end of the housing 110 of the proximity sensor 100, the O-ring 43 is in contact with a rear end portion of the male screw provided on the housing 110 in accordance with such movement.

In this state, as the cap body 50 is further screwed, not only the rear ring 42 and the O-ring 43 but also the proximity sensor 100 are pressed by the cap body 50 and thus move forward. Therefore, the front end of the proximity sensor 100 comes into contact with the closed portion 34 located at the front end of the case body 30, and thus the proximity sensor 100 is sandwiched and held in the forward and rearward direction of the case body 30.

Therefore, also in the embodiment, the positioning for the proximity sensor 100 can be surely performed by bringing the front end of the proximity sensor 100 into contact with closed portion 34 located in the front end of the case body 30. Therefore, at the time of maintenance, by releasing the fixing of the cap body 50 to the case body 30 without releasing the fixing of the case body 30 to the bracket 10, it is possible to easily perform the positioning when a proximity sensor is mounted again.

Fourth Embodiment

Figure 12A:
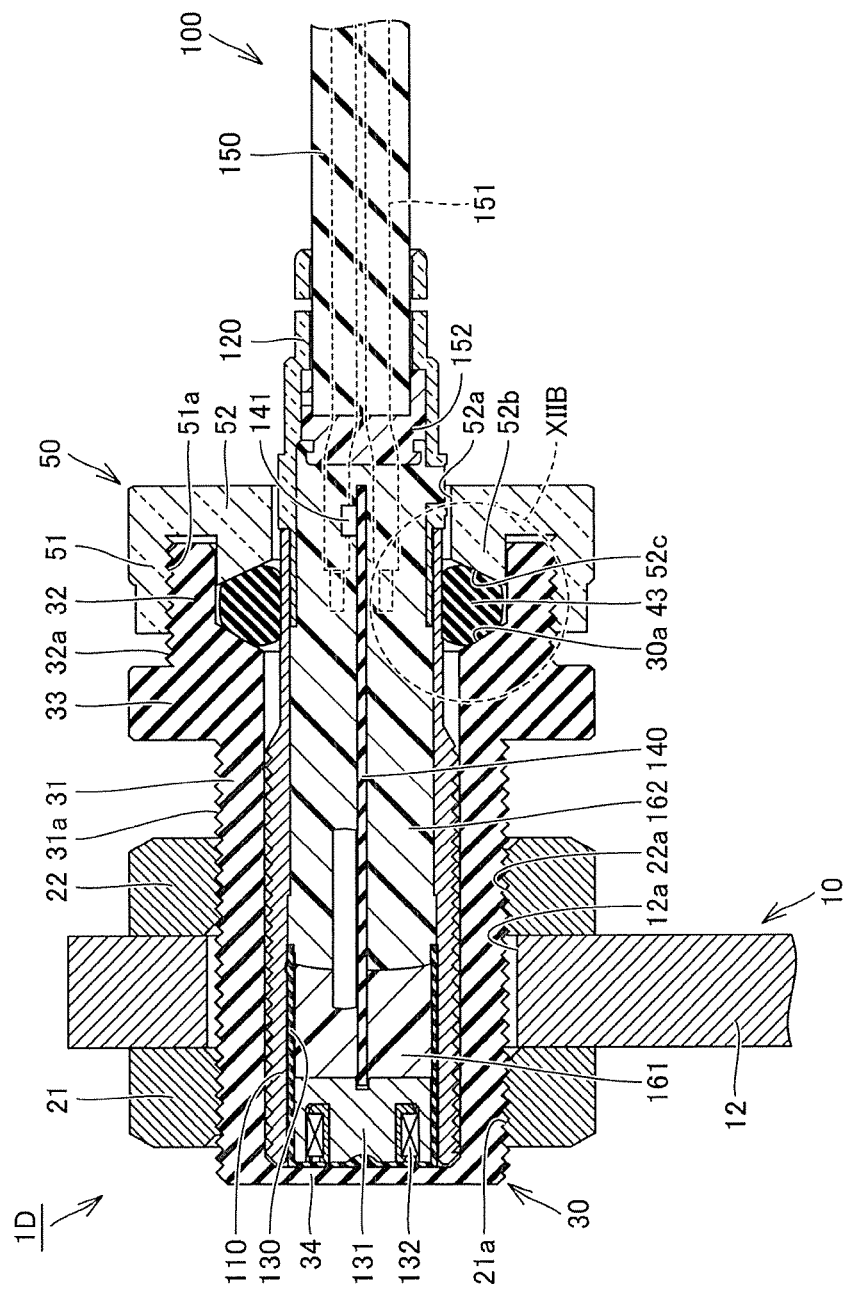
FIGS. 12A and 12B are a cross-sectional view illustrating a mounting structure of a proximity sensor according to a third embodiment and an enlarged cross-sectional view of a main part thereof.
Figure 12B:
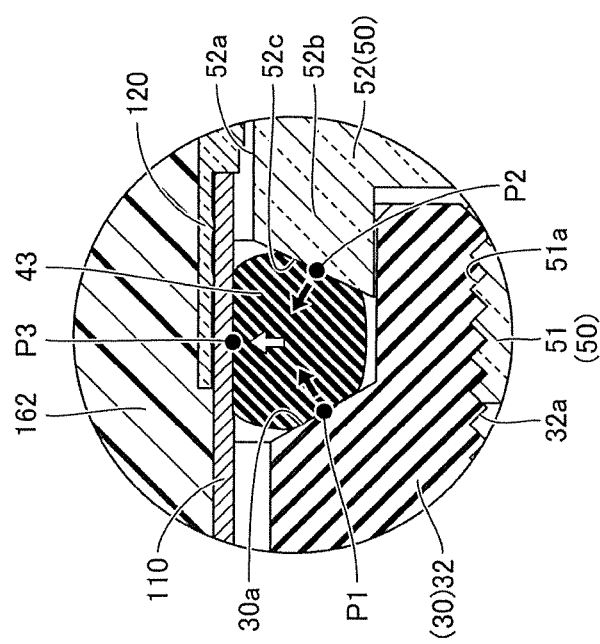

FIG. 12A is a cross-sectional view illustrating a mounting structure of a proximity sensor according to a fourth embodiment, and FIG. 12B is an enlarged cross-sectional view of a main part illustrated as a region XIIB in FIG. 12A. Hereinafter, the mounting structure of the proximity sensor according to the embodiment and the sensor adaptor used therefor will be described with reference to FIGS. 12A and 11B.

As illustrated in FIG. 12A, the mounting structure of the proximity sensor according to the embodiment is different from the mounting structure of the proximity sensor according to the above-described first embodiment in a configuration of a sensor adaptor 1D. Specifically, the sensor adaptor 1D does not include the front ring 41 as the front side auxiliary member and the rear ring 42 as the rear side auxiliary member included in the sensor adaptor 1A.

More specifically, the sensor adaptor 1D includes a bracket 10, a bolt 13 and a nut 14 (not illustrated in FIG. 12A), a front nut 21, a rear nut 22, a case body 30, an O-ring 43 and a cap body 50. Among them, components other than the case body 30 and the cap body 50 have the same configurations as those of the above-described sensor adaptor 1A.

The case body 30 includes a front cylindrical portion 31, a rear cylindrical portion 32, a flange portion 33 and a closed portion 34 and also has an inclined contact surface 30a at a predetermined position of an inner circumferential surface defining an accommodation space provided therein. The contact surface 30a faces a rear end side of the case body 30 and is located to face the O-ring 43. The contact surface 30a is inclined to approach an inside of the case body 30 as it goes away from the O-ring 43 in the forward and rearward direction of the case body 30.

The cap body 50 includes a cylindrical portion 51 and a rear wall portion 52, and an annular wall portion 52b is provided in the rear wall portion 52. The annular wall portion 52b is provided to protrude forward from a circumferential edge of an opening 52a provided in the rear wall portion 52 and has an inclined contact surface 52c at a front end thereof. The contact surface 52c is located to face the O ring 43 and is inclined to approach an inside of the case body 30 as it goes away from the O-ring 43 in the forward and rearward direction of the case body 30.

Here, the contact surface 52c provided on the cap body 50 is in contact with the rear end of the O-ring 43, and thus the O-ring 43 is pressed toward the front end side of the case body 30. Accordingly, the O-ring 43 is compressed and deformed by being sandwiched between the case body 30 and the cap body 50 in the forward and rearward direction of the case body 30 and thus is in close contact with both the proximity sensor 100 and the case body 30.

More specifically, as illustrated in FIG. 12B, a front end P1 of the O-ring 43 near a radially outer side thereof is disposed to face the contact surface 30a of the case body 30, and a rear end P2 thereof near the radially outer side is disposed to face the contact surface 52c of the cap body 50. Further, an inner end P3 of the O-ring 43 is disposed to face an outer circumferential surface of the housing 110 of the proximity sensor 100.

Therefore, as the O-ring 43 is compressed by the case body 30 and the cap body 50, deformation occurs at the front end P1 of the O-ring 43 near the radially outer side and the rear end P2 thereof near the radially outer side in a direction of a black arrow illustrated in the drawing (that is, a direction in which the O-ring 43 is pressed and squeezed in the forward and rearward direction), and thus the O-ring 43 is further deformed in a direction of an outline arrow illustrated in the drawing (that is, a direction in which the O-ring 43 is pressed and expanded mainly inward in the radial direction). As a result, the front end P1 of the O-ring 43 near the radially outer side and the rear end P2 thereof are in close contact with the contact surface 30a of the case body 30 and the contact surface 52c of the cap body 50, respectively, and the inner end P3 of the O-ring 43 is pressed against the outer circumferential surface of the housing 110 and is brought into close contact therewith.

Therefore, the portion of the proximity sensor 100 near the front end is disposed in the accommodation space of the case body 30, and thus a gap generated between the portion of the proximity sensor 100 near the front end and the case body 30 is surely sealed from a space outside the accommodation space by the O-ring 43. Accordingly, due to the mounting structure of the proximity sensor according to the embodiment and the sensor adaptor used therefor, it is possible to obtain the same effect as the effect described in the above-described first embodiment and it is possible to greatly curb the occurrence of problems at the time of maintenance.

Further, as described above, in the embodiment, although the sensor adaptor 1D does not include the front ring 41 as the front side auxiliary member, even when the proximity sensor 100 is mounted using the sensor adaptor 1D, the positioning for the proximity sensor 100 with respect to the case body 30 can be realized mainly using the O-ring 43 as the seal member, as in the case of the above-described third embodiment.

Fifth Embodiment

Figure 13A:
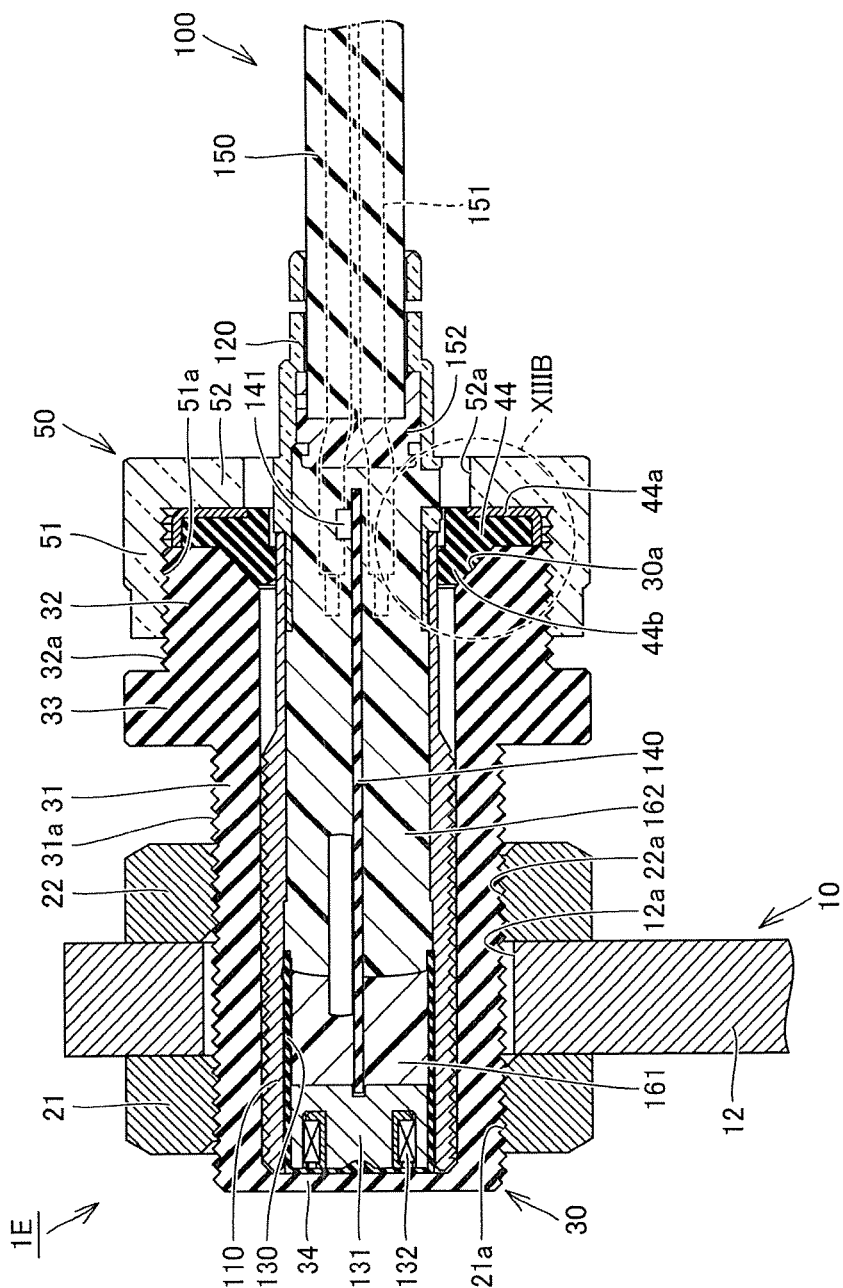
FIGS. 13A and 13B are a cross-sectional view illustrating a mounting structure of a proximity sensor according to a fourth embodiment and an enlarged cross-sectional view of a main part thereof.
Figure 13B:
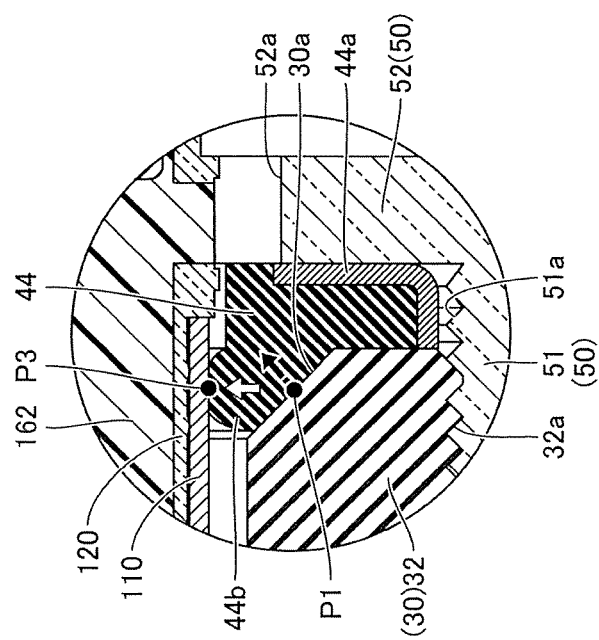

FIG. 13A is a cross-sectional view illustrating a mounting structure of a proximity sensor according to a fifth embodiment, and FIG. 13B is an enlarged cross-sectional view of a main part illustrated as a region XIIIB in FIG. 13A. Hereinafter, the mounting structure of the proximity sensor according to the embodiment and the sensor adaptor used therefor will be described with reference to FIGS. 13A and 13B.

As illustrated in FIG. 13A, the mounting structure of the proximity sensor according to the embodiment is different from the mounting structure of the proximity sensor according to the above-described first embodiment in a configuration of a sensor adaptor 1E. Specifically, the sensor adaptor 1E does not include the front ring 41 as the front side auxiliary member and the rear ring 42 as the rear side auxiliary member included in the sensor adaptor 1A and also include a seal washer 44 instead of the O-ring 43 as the seal member.

More specifically, the sensor adaptor 1E includes a bracket 10, a bolt 13 and a nut 14 (not illustrated in FIG. 13A), a front nut 21, a rear nut 22, a case body 30, a seal washer 44 and a cap body 50. Among them, components other than the case body 30 and the seal washer 44 have the same configurations as those of the above-described sensor adaptor 1A.

The case body 30 includes a front cylindrical portion 31, a rear cylindrical portion 32, a flange portion 33 and a closed portion 34 and also has an inclined contact surface 30a at an end thereof on a radially inner side. The contact surface 30a faces a rear end side of the case body 30 and is located to face the seal washer 44. The contact surface 30a is inclined to approach an inside of the case body 30 as it goes away from the seal washer 44 in the forward and rearward direction of the case body 30.

The seal washer 44 includes a substantially annular plate-shaped base portion 44a formed of metal or resin, and a sealing portion 44b formed of, for example, rubber to mainly cover a front side of the base portion 44a. The seal washer 44 is disposed to surround the housing 110 of the proximity sensor 100 which corresponds a portion thereof accommodated inside the case body 30 and thus is interposed between the case body 30 and the cap body 50 in the forward and rearward direction of the case body 30.

Here, an inner surface of the rear wall portion 52 of the cap body 50 is in contact with a rear end surface of the base portion 44a of the seal washer 44, and thus the seal washer 44 is pressed toward the front end side of the case body 30. Accordingly, the seal washer 44 is compressed and deformed by being sandwiched between the case body 30 and the cap body 50 in the forward and rearward direction of the case body 30, and thus the sealing portion 44b of the seal washer 44 is in close contact with both the proximity sensor 100 and the case body 30.

More specifically, as illustrated in FIG. 13B, the sealing portion 44b of the seal washer 44 is disposed so that a front end P1 thereof near a radially outer side is disposed to face the contact surface 30a of the case body 30, and an inner end P3 is disposed to face the outer circumferential surface of the housing 110 of the proximity sensor 100.

Therefore, as the sealing portion 44b of the seal washer 44 is compressed by the case body 30 and the cap body 50, deformation occurs at the front end P1 of the sealing portion 44b near the radially outer side in a direction of a black arrow illustrated in the drawing (that is, a direction in which the sealing portion 44b is pressed and squeezed in the forward and rearward direction), and thus the sealing portion 44b is further deformed in a direction of an outline arrow illustrated in the drawing (that is, a direction in which the sealing portion 44b is pressed and expanded mainly inward in the radial direction). As a result, the front end P1 of the sealing portion 44b near the radially outer side is in close contact with the contact surface 30a of the case body 30, and the inner end P3 of the sealing portion 44b is pressed against the outer circumferential surface of the housing 110 and is brought into close contact therewith.

Therefore, the portion of the proximity sensor 100 near the front end is disposed in the accommodation space of the case body 30, and thus a gap generated between the portion of the proximity sensor 100 near the front end and the case body 30 is surely sealed from a space outside the accommodation space by the seal washer 44. Accordingly, due to the mounting structure of the proximity sensor according to the embodiment and the sensor adaptor used therefor, it is possible to obtain the same effect as the effect described in the above-described first embodiment and it is possible to greatly curb the occurrence of problems at the time of maintenance.

(Others)

In the above-described first to fifth embodiments, the example in which the seal member of the sensor adaptor is in close contact with the housing in the casing of the proximity sensor has been described, but the seal member may be in close contact with the clamp.

Further, in the above-described first to fifth embodiments, the example in which the seal member of the sensor adaptor is disposed on the cylindrical outer circumferential surface of the housing of the proximity sensor has been described, but the seal member may be disposed on the outer circumferential surface of the housing on which the male screw is formed. In this case, the male screw of the housing bites into the seal member, and thus sealing performance can be improved.

Further, in the above-described first to fifth embodiments, the example in which the seal member of the sensor adaptor is mainly compressed and deformed in the axial direction of the case body has been described. However, the seal member may be mainly compressed and deformed in the radial direction of the case body and may be further compressed and deformed in the axial direction of the case body. For example, the gap between the case body and the casing of the sensor may be formed smaller than a thickness of the seal member so that the seal member is compressed in the radial direction and deformed and thus enters the gap when the cap body is engaged with the case body, and the seal member which has entered into the gap may be further compressed and deformed in the axial direction of the case body. Further, in this case, a squeezing rate in the radial direction of the seal member may be set to 8% or more and 30% or less.

Further, in the above-described first to fifth embodiments, the example in which the engagement between the case body of the sensor adaptor and the cap body is performed by screwing has been described. However, the engagement may be performed by a snap fit or the like.

Further, in the above-described first to fifth embodiments, the example in which the disclosure is applied to the mounting structure of the sensor having the long cylindrical shape and the sensor adaptor used therefor has been described. However, by appropriately changing the shape of each part of the sensor adaptor, the disclosure may be applied to a mounting structure of a sensor having various shapes, for example, a sensor having a prismatic shape, a sensor having a short outline, and so on, and a sensor adaptor used therefor.

Further, in the above-described first to fifth embodiments, the example in which the disclosure is applied to the mounting structure of the proximity sensor and the sensor adaptor used therefor has been described. However, the application of the disclosure is not limited thereto, and the disclosure may be applied to various mounting structures of an optical electric sensor, a temperature sensor, and so on, and sensor adaptors used therefor. For example, in the case in which the disclosure is applied to the optical electric sensor, when the case body is configured with a light-transmitting member, detection light is not shielded by the case body, and thus the disclosure can be applied in this configuration.

Further, the characteristic configurations described in the first to fifth embodiments can be combined with each other without departing from the gist of the present disclosure. In the above-described third to fifth embodiments, the example in which the entire or a part of the contact surface of the sensor adaptor which is in contact with the seal member of the sensor adaptor is constituted as the inclined surface has been described, but the contact surface may be formed as a non-inclined surface as described in the above-described first and second embodiments, instead of the inclined surface.

A sensor mounting structure according to the disclosure is formed so that a sensor is mounted on a mounting portion via a sensor adaptor for holding the sensor. The sensor includes a detection part, a casing configured to accommodate the detection part therein, and an external connection part drawn out from a rear end of the casing toward an outside. The sensor adaptor includes a cylindrical case body having an accommodation space provided therein and of which a front end is closed and a rear end is open, a cap body configured to be engageable with the rear end of the case body and having an opening, a seal member interposed between the case body and the cap body, and a fixing portion configured to fix the case body to the mounting portion by holding the case body. A portion of the sensor near a front end is inserted into the accommodation space, and a portion of the sensor located closer to a rear end side than the portion near the front end is drawn to an outside of the accommodation space via the opening. The seal member is disposed at a position on a rear end side of the case body to surround the sensor. In the sensor mounting structure according to the disclosure, the seal member is compressed and deformed at least in a forward and rearward direction of the case body by engaging the cap body with the case body, and thus the seal member is in close contact with the case body and the sensor, the portion of the sensor near the front end is disposed in the accommodation space, and a gap formed between the portion of the sensor near the front end and the case body is sealed from a space outside the accommodation space by the seal member.

In the sensor mounting structure according to the disclosure, a contact surface which is in contact with the seal member may be provided on each of the case body and the cap body, and in this case, the seal member may be pressed and compressed by the contact surface of the case body and the contact surface of the cap body in the forward and rearward direction of the case body.

In the sensor mounting structure according to the disclosure, the sensor adaptor may further include a front side auxiliary member interposed between the case body and the seal member in the forward and rearward direction of the case body to surround the sensor. In this case, a contact surface which is in contact with the seal member may be provided on each of the front side auxiliary member and the cap body, and also, in this case, the seal member may be pressed and compressed by the contact surface of the front side auxiliary member and the contact surface of the cap body in the forward and rearward direction of the case body.

In the sensor mounting structure according to the disclosure, the front side auxiliary member may have a shape capable of expanding and contracting by having a discontinuous portion in a part in a circumferential direction.

In the sensor mounting structure according to the disclosure, the sensor adaptor may further include a rear side auxiliary member interposed between the seal member and the cap body in the forward and rearward direction of the case body to surround the sensor. In this case, a contact surface which is in contact with the seal member may be provided on each of the case body and the rear side auxiliary member, and also, in this case, the seal member may be pressed and compressed by the contact surface of the case body and the contact surface of the rear side auxiliary member in the forward and rearward direction of the case body.

In the sensor mounting structure according to the disclosure, the rear side auxiliary member may have a shape capable of expanding and contracting by having a discontinuous portion in a part in a circumferential direction.

In the sensor mounting structure according to the disclosure, the sensor adaptor may further include a front side auxiliary member interposed between the case body and the seal member in the forward and rearward direction of the case body to surround the sensor, and a rear side auxiliary member interposed between the seal member and the cap body in the forward and rearward direction of the case body to surround the sensor. In this case, a contact surface which is in contact with the seal member may be provided on each of the front side auxiliary member and the rear side auxiliary member, and also, in this case, the seal member may be pressed and compressed by the contact surface of the front side auxiliary member and the contact surface of the rear side auxiliary member in the forward and rearward direction of the case body.

In the sensor mounting structure according to the disclosure, each of the front side auxiliary member and the rear side auxiliary member may have a shape capable of expanding and contracting by having a discontinuous portion in a part in a circumferential direction.

In the sensor mounting structure according to the disclosure, the contact surface may have an inclined shape which is inclined toward an inside of the case body as it goes away from the seal member in the forward and rearward direction of the case body.

In the sensor mounting structure according to the disclosure, the sensor adaptor may further include a pressing portion configured to press the sensor forward, and in this case, the sensor may be sandwiched and held between the pressing portion and the case body in the forward and rearward direction of the case body.

In the sensor mounting structure according to the disclosure, a pressed surface facing a rear side may be provided on a circumferential surface of the casing, and in this case, the pressing portion is in contact with the pressed surface and a front surface of the sensor is in contact with a front end of the case body, the sensor may be sandwiched and held between the pressing portion and the front end of the case body in the forward and rearward direction of the case body.

In the sensor mounting structure according to the disclosure, each of the casing and the case body may have a substantially long cylindrical shape.

In the sensor mounting structure according to the disclosure, the engaging between the case body and the cap body may be screwing.

In the sensor mounting structure according to the disclosure, the sensor may be a proximity sensor.

A sensor adaptor according to the disclosure which allows mounting of a sensor on a mounting portion by holding the sensor includes a case body, a cap body, a fixing portion and a seal member. The case body is a cylindrical member in which an accommodation space configured to allow insertion of a portion of the sensor near a front end is provided therein and of which a front end is closed and a rear end is open. The cap body is engageable with the rear end of the case body and has an opening configured to draw out a portion of the sensor located closer to a rear end side than the portion near the front end to an outside of the accommodation space. The fixing portion is to fix the case body to the mounting portion by holding the case body. The seal member is capable of being interposed between the case body and the cap body to surround the sensor at a position on a rear end side of the case body and is compressed and deformed at least in a forward and rearward direction of the case body by engaging the cap body with the case body, wherein the seal member is in close contact with the case body and the sensor, the portion of the sensor near the front end is disposed in the accommodation space, and thus a gap formed between the portion of the sensor near the front end and the case body is sealed from a space outside the accommodation space.

In the sensor adaptor according to the disclosure, a contact surface capable of being in contact with the seal member may be provided on each of the case body and the cap body. In this case, the seal member may be configured to be compressible by being pressed by the contact surface of the case body and the contact surface of the cap body in the forward and rearward direction of the case body.

The sensor adaptor according to the disclosure may further include a front side auxiliary member capable of being interposed between the case body and the seal member in the forward and rearward direction of the case body to surround the sensor. In this case, a contact surface which is in contact with the seal member may be provided on each of the front side auxiliary member and the cap body, and also, in this case, the seal member may be configured to be compressible by being pressed by the contact surface of the front side auxiliary member and the contact surface of the cap body in the forward and rearward direction of the case body.

In the sensor adaptor according to the disclosure, the front side auxiliary member may have a shape capable of expanding and contracting by having a discontinuous portion in a part in a circumferential direction.

The sensor adaptor according to the disclosure may further include a rear side auxiliary member capable of being interposed between the seal member and the cap body in the forward and rearward direction of the case body to surround the sensor. In this case, a contact surface which is in contact with the seal member may be provided on each of the case body and the rear side auxiliary member, and also, in this case, the seal member may be configured to be compressible by being pressed by the contact surface of the case body and the contact surface of the rear side auxiliary member in the forward and rearward direction of the case body.

In the sensor adaptor according to the disclosure, the rear side auxiliary member may have a shape capable of expanding and contracting by having a discontinuous portion in a part in a circumferential direction.

The sensor adaptor according to the disclosure may further include a front side auxiliary member capable of being interposed between the case body and the seal member in the forward and rearward direction of the case body to surround the sensor, and a rear side auxiliary member capable of being interposed between the seal member and the cap body in the forward and rearward direction of the case body to surround the sensor. In this case, a contact surface which is in contact with the seal member may be provided on each of the front side auxiliary member and the rear side auxiliary member, and also, in this case, the seal member may be configured to be compressible by being pressed by the contact surface of the front side auxiliary member and the contact surface of the rear side auxiliary member in the forward and rearward direction of the case body.

In the sensor adaptor according to the disclosure, each of the front side auxiliary member and the rear side auxiliary member may have a shape capable of expanding and contracting by having a discontinuous portion in a part in a circumferential direction.

In the sensor adaptor according to the disclosure, the contact surface may have an inclined shape which is inclined toward an inside of the case body as it goes away from the seal member in the forward and rearward direction of the case body in a state in which the seal member is interposed between the case body and the cap body.

The sensor adaptor according to the disclosure may further include a pressing portion configured to sandwich and hold the sensor between the case body and the case body in the forward and rearward direction of the case body by pressing the sensor forward.

In the sensor adaptor according to the disclosure, the case body may have a substantially long cylindrical shape.

In the sensor adaptor according to the disclosure, the engaging between the case body and the cap body may be screwing.

In the sensor adaptor according to the disclosure, the sensor adaptor may be for a proximity sensor.

According to the disclosure, it is possible to provide a sensor mounting structure and a sensor adaptor which are capable of curbing occurrence of problems at the time of maintenance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A sensor mounting structure, configured to mount a sensor on a mounting portion, wherein the sensor comprises a detection part, a casing configured to accommodate the detection part therein, and an external connection part drawn out from a rear end of the casing toward an outside, the sensor mounting structure comprising:
- a sensor adaptor configured to hold the sensor, wherein the sensor adaptor comprises a cylindrical case body having an accommodation space provided therein and of which a front end is closed and a rear end is open, a cap body configured to be engageable with the rear end of the case body and having an opening, a seal member interposed between the case body and the cap body, a fixing portion configured to fix the case body to the mounting portion by holding the case body, and a front side auxiliary member interposed between the case body and the seal member in a forward and rearward direction of the case body and configured to surround the sensor,
- wherein a rear portion of the case body is disposed inside the cap body, a front portion of the case body is inserted through the fixing portion, a flange portion of the case body is disposed between the front portion and the rear portion, the flange portion is larger in outer diameter than the rear portion, and the front portion is smaller in outer diameter than the rear portion,
- the front side auxiliary member is inserted through the flange portion,
- a portion of the sensor near a front end is inserted into the accommodation space,
- a portion of the sensor located closer to a rear end side than the portion near the front end is drawn to an outside of the accommodation space via the opening,
- the seal member is disposed at a position on a rear end side of the case body and configured to surround the sensor, and
- the seal member is compressed and deformed at least in the forward and rearward direction of the case body by engaging the cap body with the case body, and thus the seal member is in close contact with the case body and the sensor, the portion of the sensor near the front end is disposed in the accommodation space, and a gap formed between the portion of the sensor near the front end and the case body is sealed from a space outside the accommodation space by the seal member.

2. The sensor mounting structure according to claim 1, wherein
- a contact surface which is in contact with the seal member is provided on each of the front side auxiliary member and the cap body, and
- the seal member is pressed and compressed by the contact surface of the front side auxiliary member and the contact surface of the cap body in the forward and rearward direction of the case body.

3. The sensor mounting structure according to claim 2, wherein the front side auxiliary member has a shape capable of expanding and contracting by having a discontinuous portion in a part in a circumferential direction.

4. The sensor mounting structure according to claim 1, wherein the sensor adaptor further comprises a rear side auxiliary member interposed between the seal member and the cap body in the forward and rearward direction of the case body and configured to surround the sensor,
- a contact surface which is in contact with the seal member is provided on each of the front side auxiliary member and the rear side auxiliary member, and
- the seal member is pressed and compressed by the contact surface of the front side auxiliary member and the contact surface of the rear side auxiliary member in the forward and rearward direction of the case body.

5. The sensor mounting structure according to claim 4, wherein each of the front side auxiliary member and the rear side auxiliary member has a shape capable of expanding and contracting by having a discontinuous portion in a part in a circumferential direction.

6. The sensor mounting structure according to claim 1, wherein the front side auxiliary member comprises a pressing portion configured to press the sensor forward, and
- the sensor is sandwiched and held between the pressing portion and the case body in the forward and rearward direction of the case body.

7. The sensor mounting structure according to claim 6, wherein a pressed surface facing a rear side is provided on a circumferential surface of the casing, and
- the pressing portion is in contact with the pressed surface and a front surface of the sensor is in contact with a front end of the case body, the sensor is sandwiched and held between the pressing portion and the front end of the case body in the forward and rearward direction of the case body.

8. The sensor mounting structure according to claim 1, wherein each of the casing and the case body has a substantially long cylindrical shape.

9. The sensor mounting structure according to claim 1, wherein the engaging between the case body and the cap body is screwing.

10. The sensor mounting structure according to claim 1, wherein the sensor is a proximity sensor.

11. A sensor adaptor which allows mounting of a sensor on a mounting portion by holding the sensor, comprising:
- a cylindrical case body in which an accommodation space configured to allow insertion of a portion of the sensor near a front end is provided therein and of which a front end is closed and a rear end is open,
- a cap body configured to be engageable with the rear end of the case body and having an opening configured to draw out a portion of the sensor located closer to a rear end side than the portion near the front end to an outside of the accommodation space, wherein a rear portion of the case body is disposed inside the cap body,
- a fixing portion configured to fix the case body to the mounting portion by holding the case body, wherein a front portion of the case body is inserted through the fixing portion, a flange portion of the case body is disposed between the front portion and the rear portion, the flange portion is larger in outer diameter than the rear portion, and the front portion is smaller in outer diameter than the rear portion,
- a seal member capable of being interposed between the case body and the cap body to surround the sensor at a position on a rear end side of the case body and being compressed and deformed at least in a forward and rearward direction of the case body by engaging the cap body with the case body, wherein the seal member is in close contact with the case body and the sensor, the portion of the sensor near the front end is disposed in the accommodation space, and a gap formed between the portion of the sensor near the front end and the case body is sealed from a space outside the accommodation space, and
- a front side auxiliary member capable of being interposed between the case body and the seal member in the forward and rearward direction of the case body and configured to surround the sensor, wherein the front side auxiliary member is inserted through the flange portion.

12. The sensor adaptor according to claim 11, wherein a contact surface which is in contact with the seal member is provided on each of the front side auxiliary member and the cap body, and the seal member is configured to be compressible by being pressed by the contact surface of the front side auxiliary member and the contact surface of the cap body in the forward and rearward direction of the case body.

13. The sensor adaptor according to claim 12, wherein the front side auxiliary member has a shape capable of expanding and contracting by having a discontinuous portion in a part in a circumferential direction.

14. The sensor adaptor according to claim 11, further comprising a rear side auxiliary member capable of being interposed between the seal member and the cap body in the forward and rearward direction of the case body and configured to surround the sensor, wherein a contact surface which is in contact with the seal member is provided on each of the front side auxiliary member and the rear side auxiliary member, and the seal member is configured to be compressible by being pressed by the contact surface of the front side auxiliary member and the contact surface of the rear side auxiliary member in the forward and rearward direction of the case body.

15. The sensor adaptor according to claim 14, wherein each of the front side auxiliary member and the rear side auxiliary member has a shape capable of expanding and contracting by having a discontinuous portion in a part in a circumferential direction.

16. The sensor adaptor according to claim 11, wherein the front side auxiliary member comprises a pressing portion configured to sandwich and hold the sensor between the pressing portion and the case body in the forward and rearward direction of the case body by pressing the sensor forward.

17. The sensor adaptor according to claim 11, wherein the case body has a substantially long cylindrical shape.

18. The sensor adaptor according to claim 11, wherein the engaging between the case body and the cap body is screwing.

19. The sensor adaptor according to claim 11, wherein the sensor adaptor is for a proximity sensor.

* * * * *